United States Patent [19]

Ichikawa et al.

[11] Patent Number: 5,692,223

[45] Date of Patent: Nov. 25, 1997

[54] REMOTELY-CONTROLLED FLASH PHOTOGRAPHING SYSTEM

[75] Inventors: Tsutomu Ichikawa, Hashimoto; Koutaro Kawabe, Neyagawa, both of Japan

[73] Assignee: Minolta Co., Ltd., Osaka, Japan

[21] Appl. No.: 784,230

[22] Filed: Jan. 16, 1997

Related U.S. Application Data

[63] Continuation of Ser. No. 326,687, Oct. 20, 1994, abandoned.

[30] Foreign Application Priority Data

Oct. 22, 1993 [JP] Japan .................. 5-265279
Oct. 22, 1993 [JP] Japan .................. 5-265280

[51] Int. Cl.⁶ .................. G03B 15/03; G03B 15/05
[52] U.S. Cl. .................. 396/182; 396/167; 396/166; 396/159; 396/173; 396/157
[58] Field of Search .................. 396/182, 173, 396/106, 159, 163, 166, 167, 157

[56] References Cited

U.S. PATENT DOCUMENTS

| | | | |
|---|---|---|---|
| 3,648,104 | 3/1972 | Ackermann | 354/145 |
| 3,836,924 | 9/1974 | Kawasaki | 354/145 |
| 4,349,260 | 9/1982 | Ishida et al. | 354/145 |
| 4,354,141 | 10/1982 | Takematsu | 354/132 |
| 4,367,023 | 1/1983 | Ishida et al. | 354/145 |
| 4,561,751 | 12/1985 | Hagyuda | 354/132 |
| 4,626,093 | 12/1986 | Matsui et al. | 354/415 |
| 4,657,367 | 4/1987 | Kataoka | 354/415 |
| 4,717,861 | 1/1988 | Yuasa et al. | 354/132 |
| 4,816,854 | 3/1989 | Tsuji et al. | 354/413 |
| 4,897,684 | 1/1990 | Serikawa | 354/132 |
| 4,977,423 | 12/1990 | Yamano et al. | 354/402 |
| 4,999,663 | 3/1991 | Nakamura | 354/415 |
| 5,164,759 | 11/1992 | Yasukawa | 354/132 |
| 5,227,836 | 7/1993 | Yasukawa et al. | 354/415 |
| 5,268,730 | 12/1993 | Takagi | 354/415 |
| 5,272,500 | 12/1993 | Taniguchi et al. | 354/145.1 |
| 5,384,611 | 1/1995 | Tsuji et al. | 354/145.1 |
| 5,422,702 | 6/1995 | Yasukawa | 354/415 |
| 5,448,331 | 9/1995 | Hamada et al. | 354/403 |

FOREIGN PATENT DOCUMENTS

4-343336  11/1992  Japan .
5-34789   2/1993   Japan .

OTHER PUBLICATIONS

Manual entitled "Macro Ring Lite ML-2" of Canon Co., Ltd.
Brochure of Japan Camera Show held in 1986.

*Primary Examiner*—Safet Metjahic
*Assistant Examiner*—Michael Dalakis
*Attorney, Agent, or Firm*—Sidley & Austin

[57] ABSTRACT

A flash photographing system includes a first firing device operable to fire a first flash light effective for photography of the camera device; a second firing device operable to fire a second flash light ineffective for photography of the camera device, the second firing device having two different emission modes; and a changer operable to change over the two emission modes of the second firing device. The emission modes are changed over in accordance with selection of macro or portrait photography mode. The second flash light consists of intermittently emitted flash lights. The emission modes of the second flash light are different from each other in aspect of the light amount, emitting frequency, number of emitting times, or emitting time.

14 Claims, 18 Drawing Sheets

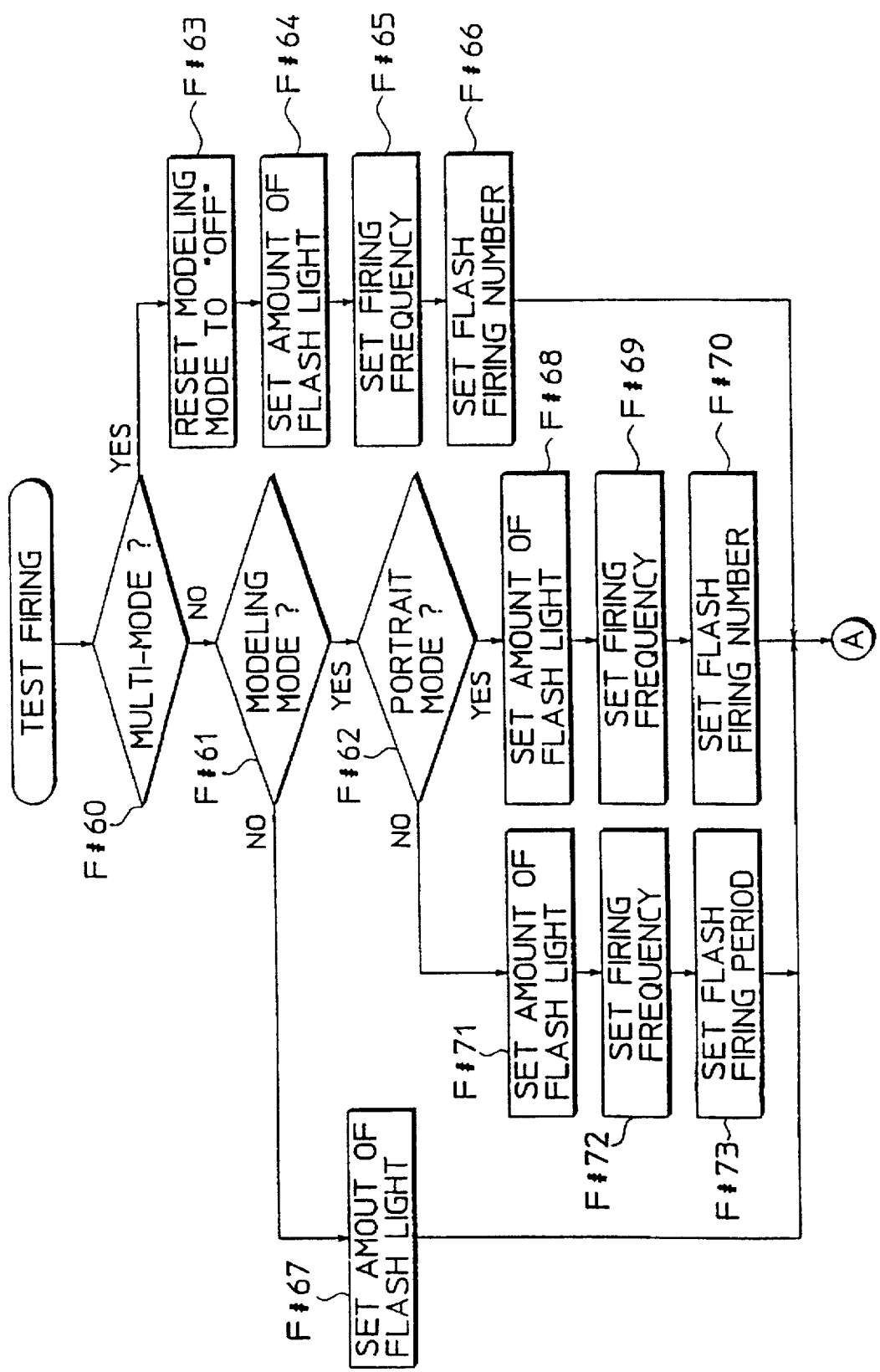

REMOTELY-CONTROLLED FLASH PHOTOGRAPHING SYSTEM

CROSS REFERENCE TO RELATED APPLICATION

This is a continuation of U.S. patent application Ser. No. 08/326,687 filed Oct. 20, 1994, now abandoned.

BACKGROUND OF THE INVENTION

This invention relates to a remotely-controlled flash photographing system including a camera and a flash device which is remotely controllable by a radio signal transmitted from the camera.

When, for example, an object standing in front of a wall in a room is photographed while firing a flash device mounted on a camera device, the flash light is intercepted by the object and an inadvertent shadow is cast on the wall behind the object, thereby reducing the quality of a final picture.

A flash device has been commercially available which is remotely controllable, for example, by a flash light emitted from a built-in flash of a camera device. A relatively satisfactory remotely-controlled flash photographing system can be realized by combining such a flash device with the camera. Since this flash photographing system includes the flash device detachable from the camera device, an object can be illuminated with a flash light in a more suitable manner by setting the flash device in such a position as to cast no shadow on the wall or the like.

However, even with the above system, whether or not the flash light has actually created a shadow can be only confirmed in a printed picture after the photographing operation. Thus, it requires relatively high level of knowledge and experience concerning the flash photography to set an illuminating direction of the flash light suitable for a photographing condition of the object and some operators cannot make use of the above function.

In order to avoid an undesirable event where the shadow is created by the flash light emitted to illuminate the object during the photographing operation, a flash device has been commercially available which is provided with a light emitter rotatable in a vertical or horizontal direction, so that an illuminating direction of the flash light can be changed. With this flash device, the illuminating direction of the flash light to the object is changed by causing the flash light to be reflected by a ceiling or like reflector, thereby reducing the shadow cast on the wall or the like.

In responding to these problems, a flash device has been recently proposed and commercially available with which the presence of shadow cast on and behind an object due to the flash light can be confirmed before the photographing operation. This flash device is provided with a special test firing mode for confirming the presence or absence of the shadow (hereinafter referred to as a modeling mode) in addition to a normal test firing mode for confirming the firing of the flash device. The test firing can be made in the modeling mode by operating a test firing switch provided in the flash device. In the modeling mode, a flash light is emitted on and off with a frequency of about 20 Hz (hereinafter referred to as a multi-firing). When the multi-firing is applied to the macrophotography for photographing, for example, flowers, small shadows created in petals and leaves can be confirmed.

Since the conventional remotely-controlled flash photographing systems are not provided with the test firing function in the modeling mode, it is difficult to confirm before the photographing operation whether shadows are cast on and behind the object due to the flash light.

It can be also considered to employ the flash device provided with the modeling mode in the remotely-controlled flash photographing system. In the modeling mode of the conventional flash device, the multi-firing is realized by emitting a low amount of light with a relatively high frequency. Specifically, the flash firing condition in the conventional modeling mode is designed for the macrophotography or an operation for photographing an object located relatively close to the camera, and is effective in confirming the presence of small shadows created on and behind the object. When this condition is applied to a normal flash photographing operation for photographing an object located relatively away from the camera such as a snapshot, an amount of emitted light is insufficient since the object several meters away from the flash device and it is difficult to effectively confirm in which direction the shadow is cast behind the object and how big this shadow is. Further, since the test firing switch is provided in the flash device, the test firing in the modeling mode cannot be carried out while an operator is looking through a viewfinder of the camera. This makes it difficult for the operator to confirm in an actual field whether the flash light creates the shadow.

SUMMARY OF THE INVENTION

It is an object of the present invention to provide a flash photographing system which has overcome the problems residing in the prior art.

The present invention is directed to a flash photographing system comprising: a camera to photograph an object; a first firing device operable to fire a first flash light effective for photography of the camera device; a second firing device operable to fire a second flash light ineffective for photography of the camera device, the second firing device having two different emission modes; and a changer operable to change over the two emission modes of the second firing device.

Also, the present invention is directed to a flash photographing system comprising: a camera to photograph an object; a flash device removably mounted on the camera to emit flash light; a controller operable to control the flash device to intermittently emit flash light a specified number of times; and an operable member to instruct the intermittent flash light emission to the controller.

Further, the present invention is directed to a flash photographing system comprising: a camera including: a photographing device operable to photograph an object; a first operable member to instruct a test firing; a second operable member to drive the photographing device to execute photography; and a signal generator operable to generate a first control signal in accordance with operation of the first operable member and a second control signal in accordance with operation of the second operable member, and transmit the generated first and second control signals; a flash device including: a signal receiver operable to receive the first and second control signals; a flash light emitter operable to emit flash light; a first firing controller in responsive to the first control signal to control the flash light emitter to intermittently emit flash light a specified number of times to execute the test firing; and a second firing controller in responsive to the second control signal to control the flash light emitter to emit flash light for the photography.

Furthermore, the present invention is directed to a flash device for use with a camera capable of transmitting first and second control signals, the flash device comprising: a signal receiver operable to receive the first and second control signals; a flash light emitter operable to emit flash light; a first firing controller in responsive to the first control signal to control the flash light emitter to intermittently emit flash light a specified number of times to execute the test firing; and a second firing controller in responsive to the second control signal to control the flash light emitter to emit flash light for the photography.

Moreover, the present invention is directed to a flash photographing system comprising: a camera to photograph an object, the camera having a plurality of selective photography modes; a photography mode selector operable to select a desired photography mode; a flash device operable to emit flash light, the flash device having a plurality of firing modes; and a firing mode changer operable to change the firing mode of the flash device in accordance with a selected photography mode.

According to the invention, the flash photographing system includes a camera and a flash device. The camera is provided with an operable member for instructing a test firing and a transmitter for, in response to operation of the operable member, transmitting to the flash device a test firing control signal. The flash device is provided with a flash light emitter for emitting flash light, a receiver for receiving the test firing control signal, and a firing controller for causing the flash light emission in accordance with predetermined firing conditions.

Accordingly, an operator can be allowed to remotely control the test firing carried out to confirm the presence of the shadow created by the flash light from the flash device by using the camera while looking through a viewfinder. Further, he can easily confirm the presence of the shadow cast on the object by the flash light in an actual view.

The flash device is capable of test firing. The flash device has two firing modes. These two modes can be switchingly set. Accordingly, the direction and size of the shadow caused by the flash light according to a photographing purpose can be easily confirmed by carrying out the test firing in the first mode in a normal photographing operation such as when taking a snapshot and in the second mode in a macrophotography.

These and other objects, features and advantages of the present invention will become more apparent upon a reading of the following detailed description and accompanying drawings.

BRIEF DESCRIPTION OF THE DRAWINGS

FIGS. 16A and 16B are flowcharts showing a firing control operation when a test firing is instructed;

DETAILED DESCRIPTION OF THE PREFERRED EMBODIMENTS OF THE INVENTION

Figure 1:
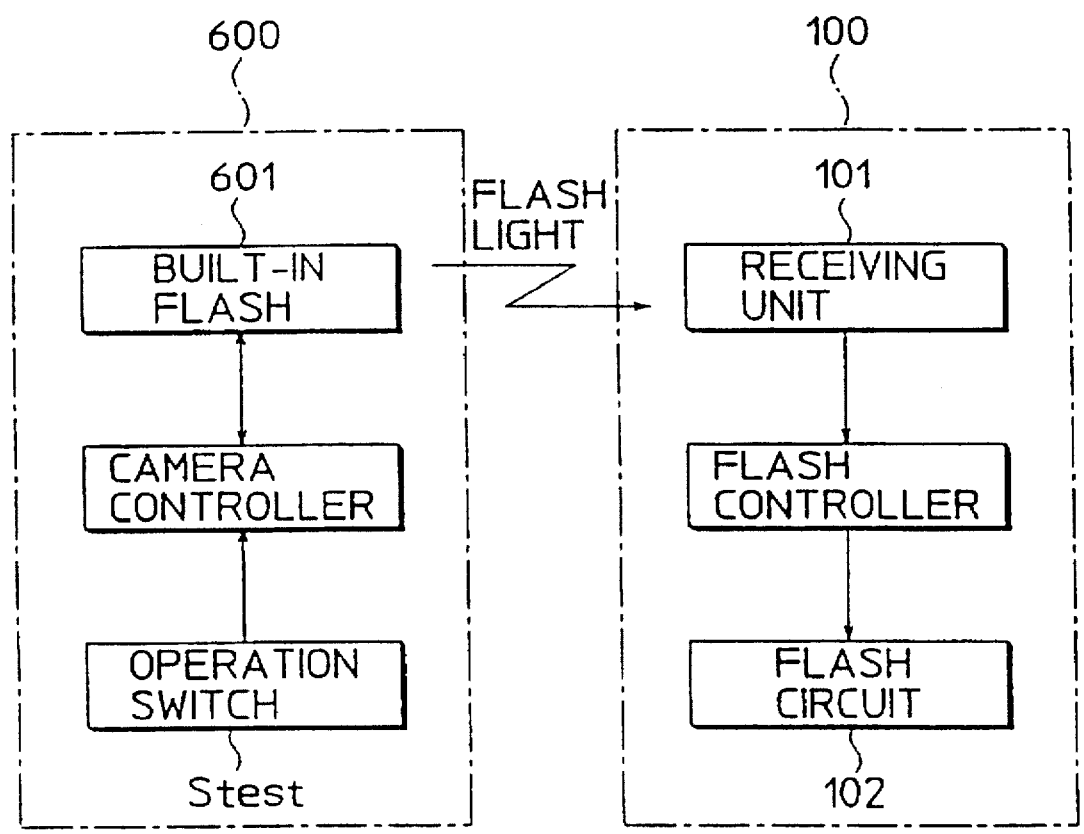
FIG. 1 is a block diagram showing a construction of a remotely-controlled flash photographing system according to the invention.

FIG. 1 is a block diagram showing a concept of a remotely-controlled flash photographing system according to the invention.

The flash photographing system mainly includes a camera device 600 and a flash device 100. The camera device 600 is provided with a built-in flash 601 and is capable of transmitting a firing control signal in the form of a flash light from the built-in flash 601 to the flash device 100. The flash device 100 is provided with a receiving unit 101 which receives the firing control signal carried by the flash light from the built-in flash 601, and fires in accordance with the received signal.

The flash device 100 has two modeling modes to be described later. When the receiving unit 101 receives a test firing request signal carried by a flash light from the built-in flash 601 of the camera device 600, a flash circuit 102 carries out a test firing in accordance with predetermined firing conditions corresponding to the set modeling mode.

The camera device 600 includes a switch Stest which is used to instruct the test firing in the modeling mode. When the switch Stest is operated, the built-in flash 601 emits the flash light, thereby transmitting the test firing request signal. Thus, even in a state where the flash device 100 is detached from the camera device 600, the flash device 100 can be remotely controlled by the camera device 600 so as to carry out the test firing. This permits an operator to confirm in an actual field whether the flash light creates a shadow, while looking through a viewfinder.

Figure 3:
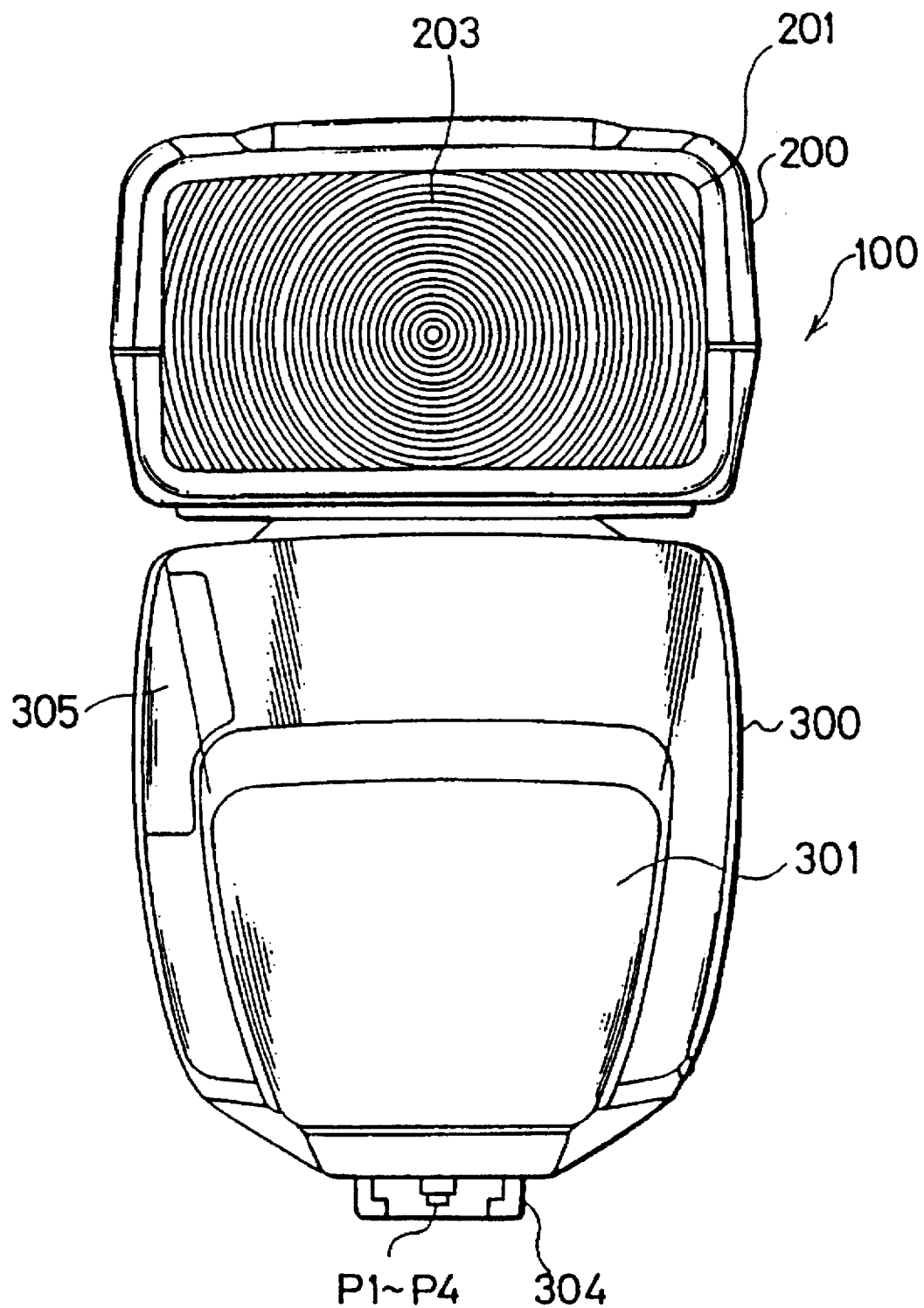
FIG. 3 is a front view showing the flash device.
Figure 4:
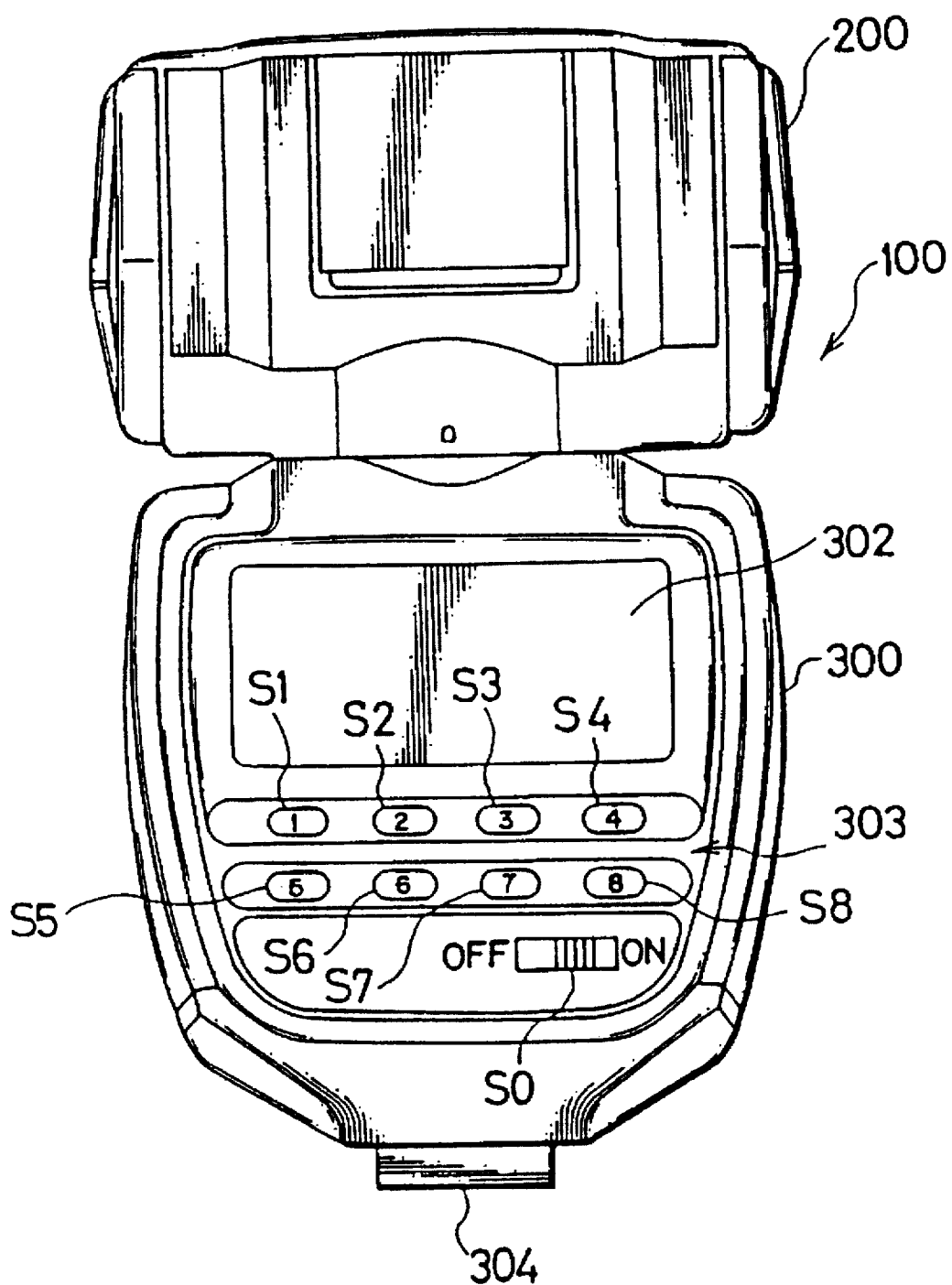
FIG. 4 is a rear view showing the flash device.

First, a construction of the flash device 100 will be described. FIGS. 3 and 4 are front and rear views showing the flash device, respectively.

The flash device 100 includes a light emitter unit 200 and a firing control unit 300. The light emitter unit 200 is mounted above the firing control unit 300 and has at a front side a window 201 through which a flash light is emitted. A condenser lens 203 including a Fresnel lens is provided in the window 201. Behind the condenser lens 203 is provided a xenon discharge tube acting as a light source.

The firing control unit 300 is provided on its front face with a receiving unit 301 for receiving the flash light emitted from the built-in flash 601 of the camera device 600 and a battery storage 305; on its rear face with a display unit 302 including a LCD (liquid crystal display) and an operation unit 303; and on its bottom face with a mount 304 for mounting the flash device 100 on the camera device 600. Four contact pins P1 to P4 for connecting communication lines with the camera device 600 project from the mount 304.

The display unit 302 is adapted to display a variety of information concerning functions of the flash device 100. Specifically, display contents of the display unit 302 are as shown in FIG. 5.

Figure 5:
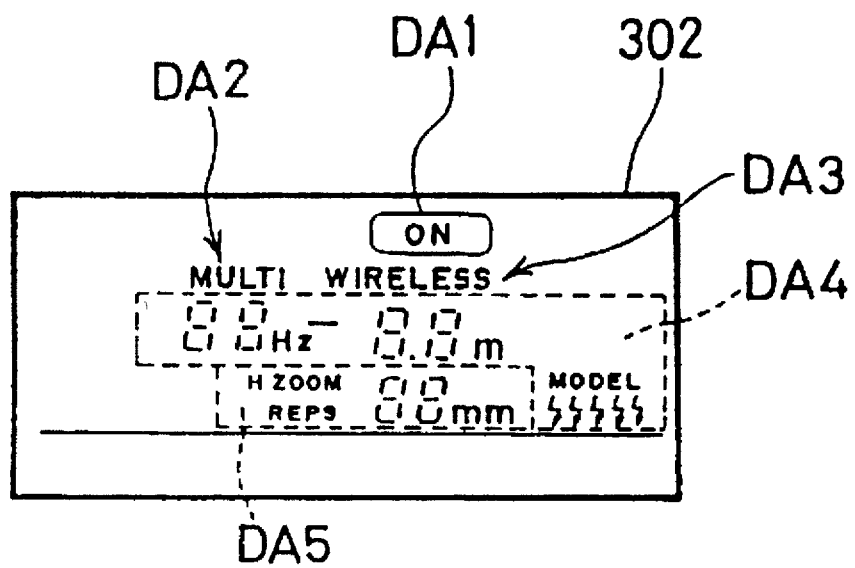
FIG. 5 is a diagram showing contents displayed in a display device.

In FIG. 5, a display section DA1 indicates a powered state of the flash device 100. When the flash device 100 is powered, a display "ON" is made. A display section DA2 indicates a set flash firing mode. The flash device 100 has two flash firing modes: a multi-mode in which a flash light is emitted a plurality of times and a single mode in which the flash light is emitted only once. When the flash firing mode is set to the multi-mode, a display "MULTI" is made. The flash firing modes will be described in more detail later.

A display section DA3 indicates a set firing control. The flash device 100 has two firing control modes: a wireless mode in which it is remotely controlled by the flash light from the built-in flash 601 of the camera device 600 and a normal (non-wireless) mode in which it is controlled by conducting a serial communication with the camera device 600 by means of the communication lines connected by way of the contact pins P1 to P4. When the wireless mode is set, a display "WIRELESS" is made. The firing control will be described in more detail later.

A display section DA4 indicates whether or not the modeling mode is set, a firing frequency and an amount of flash light to be emitted. In the modeling mode, a test firing is carried out to confirm the direction and size of the shadow cast on and behind an object due to the flash light. The flash device 100 has two modeling modes: a portrait mode and a macro-mode. The firing purpose, firing conditions and firing contents in these modes are as shown in TABLE-1.

When the portrait mode is set, three arrows and "MODEL" are displayed. When the macro-mode is set, five arrows and "MODEL" are displayed. The flash device 100 is fired cyclically a plurality of times in the multi-mode and modeling mode. When the firing frequency is set, a set value is displayed in the display section DA4. It will be appreciated that an amount of flash light to be emitted is displayed in an illuminating coverage (m) of the flash light.

TABLE 1

|  | PORTRAIT MODE | MACRO-MODE |
| --- | --- | --- |
| PURPOSE | To confirm a shadow of an object cast on a wall or the like | To confirm small shadows created in flower petals and leaves |
| FREQUENCY | 2 Hz | 40 Hz |
| FFN | 3 times | 160 times |
| FFT | 1.5 second | 4 seconds |
| GN | 5.6 each time | 1.2 each time |

FFN and FFT denotes flash firing number and flash firing time, respectively.

A display section DA5 indicates a zooming position and a flash firing time. The flash device 100 is provided with a zooming function of changing the illuminating coverage of the flash light, and has a plurality of settable zooming positions as described later. The zooming of the flash light is carried out, for example, by changing the position of a reflector which is provided at a rear face of the xenon discharge tube movably toward and away from the xenon discharge tube.

When the zooming position is set, a focal length (mm) of a lens corresponding to the set zooming position is displayed in the display section DA5. When the flash firing number N is set in the multi-mode or modeling mode, the set value N and "RESP" are displayed in the display section DA5.

FIGS. 6 to 11 are diagrams showing examples of display in the display unit 302.

Figure 6:
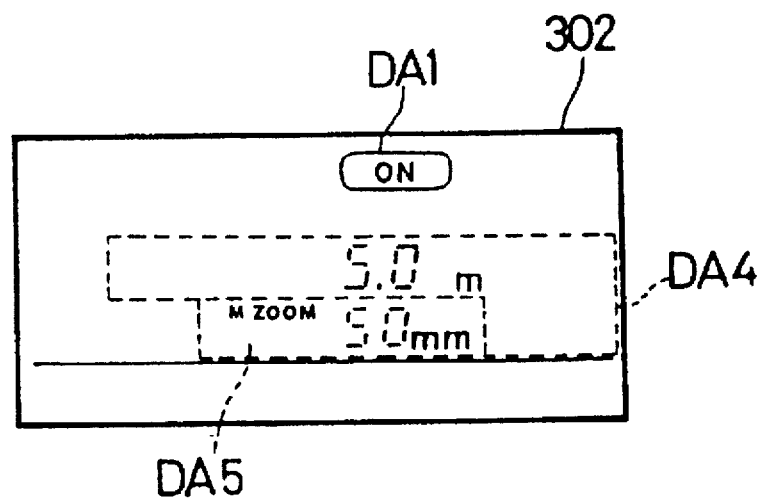
FIG. 6 is a diagram showing an example of display made when a normal firing mode is set.

FIG. 6 shows an example of display in a normal use, wherein the normal mode is set as a firing control mode and the single mode is set as a flash firing mode. In this case, the amount of light to be emitted and the zooming position are displayed in the display unit 302. FIG. 6 specifically shows a case in which the zooming position is set to 50 mm.

Figure 7:
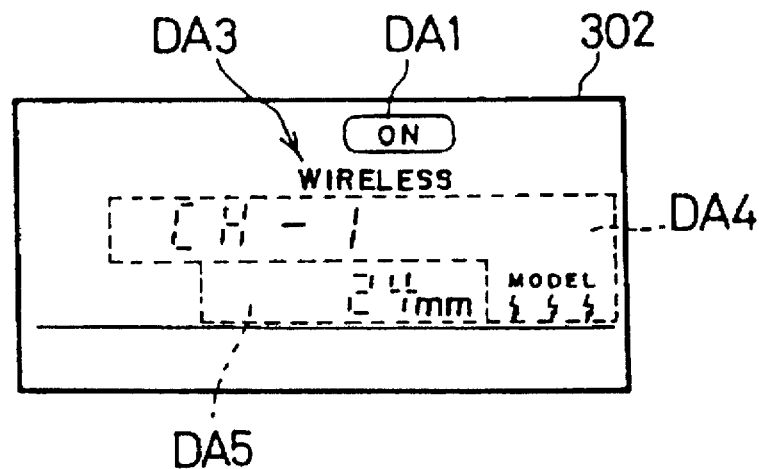
FIG. 7 is a diagram showing an example of display made when a wireless mode and a portrait mode as a modeling mode are set.

FIG. 7 shows an example of display wherein the wireless mode is set as a firing control mode; the portrait mode is set as a modeling mode; and the zooming position is set to 24 mm. The displays "WIRELESS", "CH-1", three arrows and "MODEL" are made to indicate the firing control mode, a channel display for the wireless firing, the portrait mode, respectively. "24 mm" is displayed to indicate the zooming position.

Figure 8:
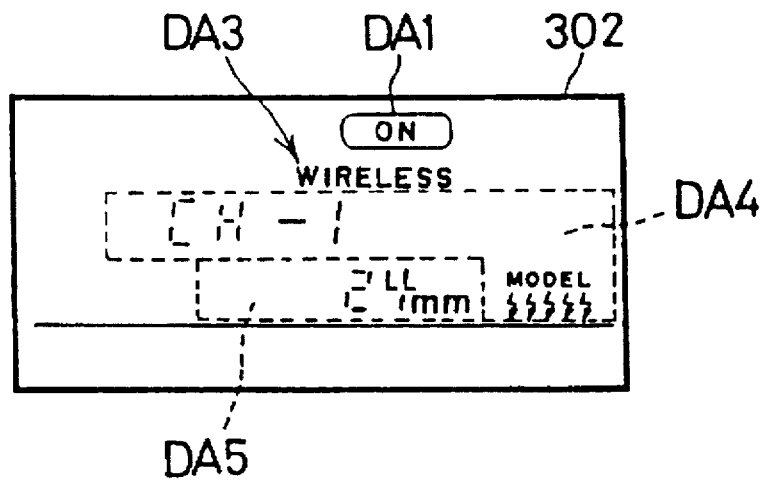
FIG. 8 is a diagram showing an example of display made when the modeling mode is changed from the portrait mode to a macro-mode in the display state shown in, FIG. 7.

FIG. 8 shows a case where the modeling mode is changed from the portrait mode to the macro-mode in the display state shown in FIG. 7. In this case, not three arrows, but five arrows are displayed.

Figure 9:
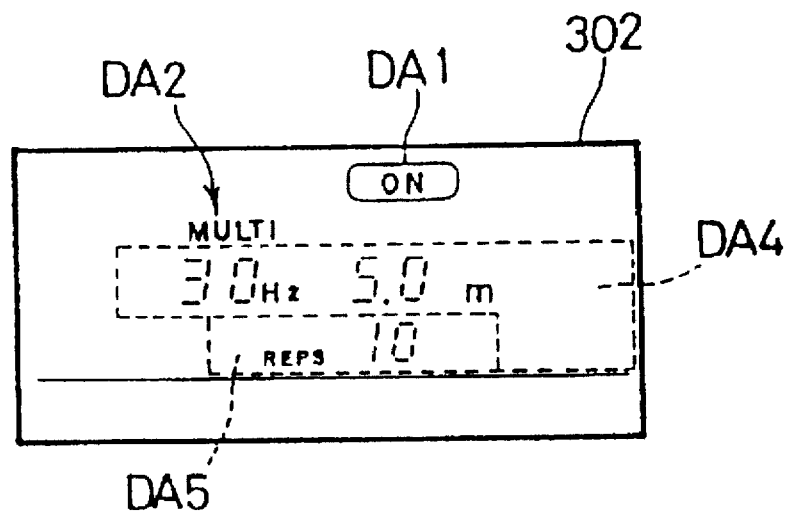
FIG. 9 is a diagram showing an example of display made when a multi-mode is set as a flash firing mode.

FIG. 9 shows an example of display wherein the multi-mode is set as a flash firing mode. The displays "MULTI", "30 Hz", "5.0 m" and "RESP 10" are made to indicate the flash firing mode, the firing frequency, the photographing distance and the flash firing number, respectively. The firing frequency, photographing distance and flash firing number are flash firing conditions.

Figure 10:
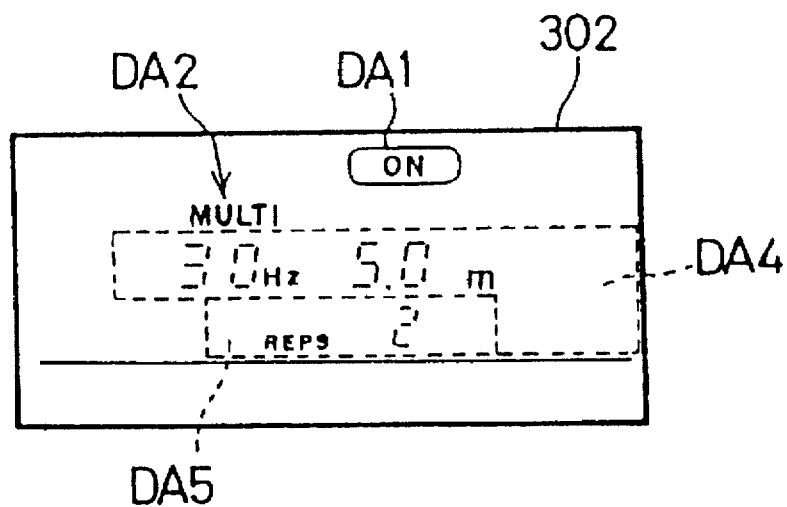
FIG. 10 is a diagram showing an example of display made when a flash firing number (how many times the flash device is fired) is changed in the display state shown in FIG. 9.

FIG. 10 shows a case where the flash firing number is changed to in the display state shown in FIG. 9. The display "RESP 10" is changed to the display "RESP 2".

Figure 11:
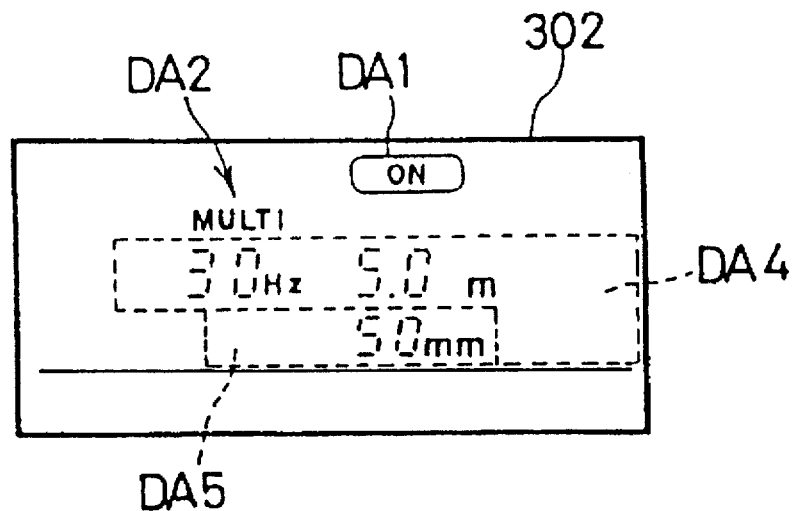
FIG. 11 is a diagram showing an example of display made when the display of the flash firing number is changed to that of a zooming position in the display state shown FIG. 10.

FIG. 11 shows a case where the display of the flash firing number is changed to the display of the zooming position. Specifically, the display "RESP 10" is changed to the display "50 mm".

Referring back to FIG. 4, the operation unit 303 includes eight switches S1 to S8 and a power switch S0. The power switch S0 is a slide switch, and a main power of the flash device 100 is turned on when the switch S0 is slid to the "ON" side.

The switch S1 is a switch for setting the amount of flash light to be emitted. Each time the switch S1 is pressed, the amount of flash light to be emitted is cyclically changed in the order of "1", "½", "¼", "⅛", "1/16", and "1/32".

The switch S2 is a switch for setting the modeling mode. Each time the switch S2 is pressed, the modeling mode is cyclically changed in the order of "OFF", "Portrait Mode" and "Macro-Mode".

The switch S3 is a switch for setting the firing control mode. Each time the switch S3 is pressed, the firing control mode is alternately changed between "Wireless Mode" and "Normal Mode".

The switch S4 is a switch for starting a test firing. When the switch S4 is pressed after the charging is completed, the test firing is carried out.

The switch S5 is a switch for setting the flash firing mode. Each time the switch S5 is pressed, the flash firing mode is alternately changed between "Multi-Mode" and "Single Mode".

The switch S6 is a switch for setting the firing frequency. Each time the switch S6 is pressed, the firing frequency is cyclically changed in the order of "100 Hz", "50 Hz", "30 Hz" and "10 Hz".

The switch S7 is a switch for setting the flash firing number. Each time the switch S7 is pressed, the flash firing number is cyclically changed in the order of "10 times", "5 times" and "2 times".

The switch S8 is a switch for setting the zooming position. Each time the switch S8 is pressed, the zooming position is cyclically changed in the order of "70 mm", "50 mm", "35 mm", "28 mm" and "24 mm".

When the flash device 100 is powered, the modes and flash firing conditions corresponding to the switches S1 to S8 (except the switch S4) are initialized; the amount of flash light="1", the modeling mode="OFF", the firing control mode="Normal", the flash firing mode="Single", the firing frequency="100 Hz", the flash firing number "10 times", and the zooming position="70 mm".

Figure 2:
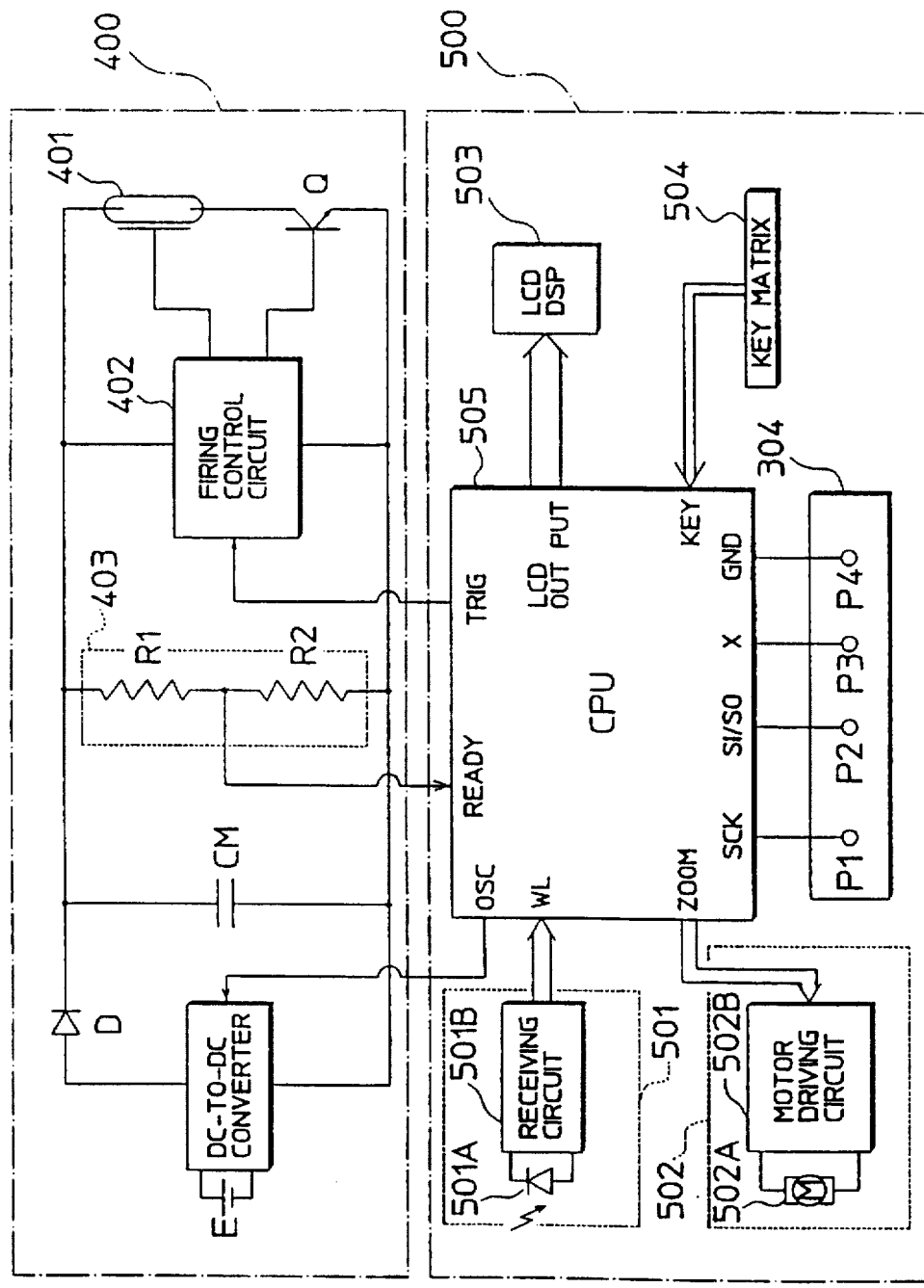
FIG. 2 is a circuit construction diagram of a flash device used in the remotely-controlled flash photographing system.

FIG. 2 is a circuit construction diagram of the flash device 100. In this figure, a flash circuit 400 is provided in the light emitter unit 200 and a flash control circuit 500 is provided in the firing control circuit 300.

The flash circuit 400 includes the xenon discharge tube 401 acting as a light source, a firing control circuit 402, a main capacitor CM, a voltage detector 403, a dc-to-dc converter 404, and a battery E. The control circuit 402 controls the light emission of the xenon discharge tube 401. The main capacitor CM applies discharge energy to the xenon discharge tube 401. The voltage detector 403 detects the voltage of the main capacitor CM. The converter 404 generates a voltage to be applied to the main capacitor CM.

The main capacitor CM is connected to an output terminal of the dc-to-dc converter 404 by way of a rectifier diode D, so that it is charged with the voltage of given high level by the converter 404.

The voltage detector 403 including resistors R1 and R2 connected in series is connected in parallel to the main capacitor CM, and a voltage Vc from the main capacitor CM is detected as a divided voltage Vc' (=R2×Vc/(R1+R2)). A series circuit consisting essentially of the firing control circuit 402, the xenon discharge tube 401 and a switching transistor Q including an IGBT (insulated gate bipolar transistor) is connected in parallel with the main capacitor CM, so that the xenon discharge tube 401 is caused to discharge the charges stored in the main capacitor CM. In this way, the light is emitted from the xenon discharge tube 401.

A trigger terminal of the xenon discharge tube 401 and a base of the switching transistor Q are connected to control terminals T1 and T2 of the firing control circuit 402, respectively. The light emission of the xenon discharge tube 401 is controlled by the control circuit 402. The control circuit 402 controls an output of a trigger signal to the xenon discharge tube 401 and turns on and off the switching transistor Q in accordance with the firing conditions input from a CPU 505 such as the amount of flash light to be emitted, flash firing number and firing frequency, thereby causing the xenon discharge tube 401 to emit light in accordance with the specified firing conditions.

For example, in the testing firing in the single mode, after turning on the switching transistor Q so that the high voltage Vc from the main capacitor CM is applied to the xenon discharge tube 401, the firing control circuit 402 sends the trigger signal only once at a specified firing timing to cause the xenon discharge tube 401 to emit light once. Further, in the macro-mode, the control circuit 402 sends to the xenon discharge tube 401 a pulse train signal having a frequency of 40 Hz as a trigger signal for 4 seconds, thereby causing the xenon tube 401 to emit light 160 times (multi-firing).

The flash control circuit 500 is provided with a light receiving circuit 501 constituting the receiving unit 301, a zooming circuit 502 for controlling the zooming of the light emitter unit 201, an LCD 503 constituting the display unit 302, a key matrix 504 constituting the operation unit 303 and the CPU 505 for centrally controlling the driving of the flash device 100.

The light receiving circuit 501 includes a photodetector 501A and a receiver 501B for receiving the information transmitted from the camera device 600 based on a light reception signal from the photodetector 501A.

The receiver 501B shapes the wave of the light received by the photodetector 501A and sends it to the CPU 505. The information received by the receiver 501B is input to a WL terminal of the CPU 505 to be used for the firing control. For example, when the photodetector 501A receives the flash light, the receiver 501B outputs a low level pulse to the WL terminal of the CPU 505. Upon receipt of this pulse, the CPU 505 proceeds to the interrupt control, thereby performing the firing control in accordance with the information transmitted from the camera device 600.

The zooming circuit 502 controls the driving of the reflector (not shown) of the xenon discharge tube 401, and includes a drive motor 502A for driving the reflector and a motor driving circuit 502B for controllably driving the drive motor 502. The motor driving circuit 502B sets the reflector at a instructed zooming position by driving the drive motor 502A by a given amount in accordance with the information concerning the zooming position output from ZOOM terminal of the CPU 505.

The LCD 503 includes a plurality of display sections DA1 to DA described above. The specified display sections are turned on in accordance with the display information output from an LCD output terminal of the CPU 505.

The key matrix 504 includes the power switch S0 and the switches S1 to S8, and signals obtained as a result of operating these switches are input to a KEY terminal of the CPU 505.

In addition to the terminals "WL", "ZOOM", "LCD OUTPUT" and "KEY", the CPU 505 has control terminals "OSC", "READY" and "TRIG" and terminals "SCK", "SI/SO", "X" and "GND" to be connected with the camera device. The terminals "SCK", "SI/SO", "X" and "GND" are connected with the contact pins P1 to P4 provided at the mount 304, respectively.

The OSC terminal is a control terminal for controllably boosting the dc-to-dc converter 404. The READY terminal is a control terminal for monitoring the charged state of the main capacitor CM. The voltage of the main capacitor CM detected by the voltage detector 403 is input to the READY terminal. The CPU 505 outputs a boost control signal from the OSC terminal so as to start the charging, when the voltage of the main capacitor CM falls below a specified voltage value.

The TRIG terminal is a control terminal for controlling the light emission of the xenon discharge tube 401. A control signal is output through the TRIG terminal to the firing control circuit 402 at a firing timing corresponding to the firing conditions such as the amount of flash light to be emitted, flash firing number and firing frequency.

The SCK terminal is an input terminal to which the control signals and clocks used for the serial communication between the CPU 505 and a CPU provided in the camera device 600 are input. The SI/SO terminal is an input/output terminal for the data transferred between the CPU 505 and the CPU of the camera device 600. The X terminal is an input terminal to which a timing signal of an X contact is input from the camera device 600. The GND terminal is a ground terminal.

The firing operation of the flash device 100 will be described next with reference to flowcharts shown in FIGS. 12 to 16B.

Figure 12:
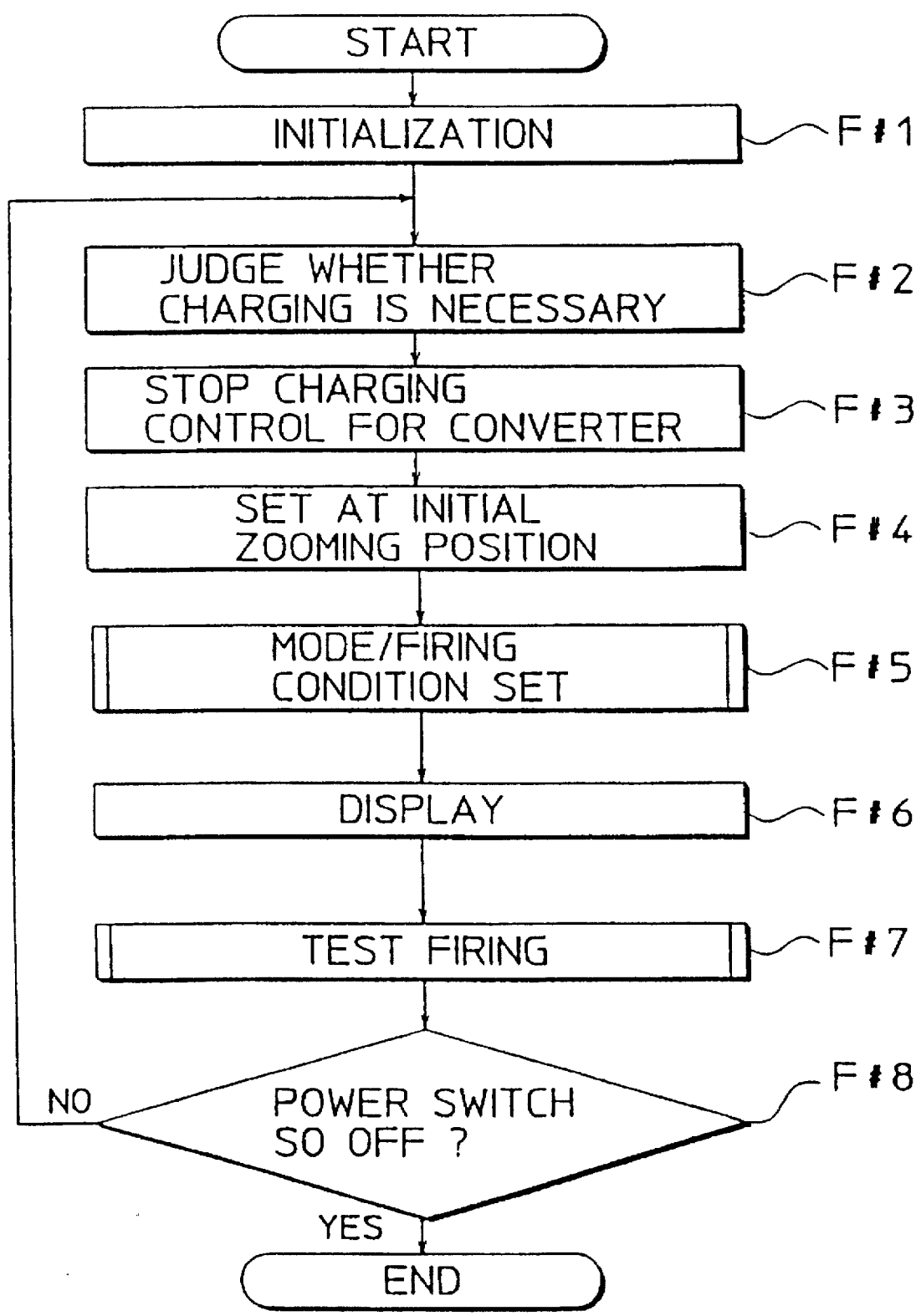
FIG. 12 is a flowchart showing a main routine of controlling the firing of the flash device used in the flash photographing system.

FIG. 12 is a flowchart showing a main routine. This routine is applied in either one of the normal mode and wireless mode.

When the power switch S0 is turned on and the flash device 100 is activated, a variety of modes and firing conditions corresponding to the states of the switches S1 to S8 are initialized (Step F#1). It is then judged whether the charging is necessary by judging whether the voltage Vc of the main capacitor CM detected by the voltage detector 403 is in excess of a specified value (Step F#21. If the voltage Vc is the specified value or lower, a charging control signal is sent from the CPU 505 to the dc-to-dc converter 404 to start the charging of the main capacitor CM. When the voltage Vc becomes in excess of the specified value, it is judged that the charging has been completed and the charging control for the converter 404 is stopped (Step F#3).

After the reflector of the xenon discharge tube 401 is set at an initial zooming position (Step F#4). In Step F#5, the specified modes and firing conditions are set according to the inputs from the switches S1 to S8 and a specified display corresponding to the set modes and firing conditions is made (Step F#6). The test firing is carried out in response to the operation of the switch S4 (Step F#7).

While the power switch S0 is on, the operations in Steps F#1 to F#7 are carried out (a loop of Steps F#1 to F#8). The flash firing operation ends when the power switch S0 is turned off (YES in Step F#8).

Figure 13:
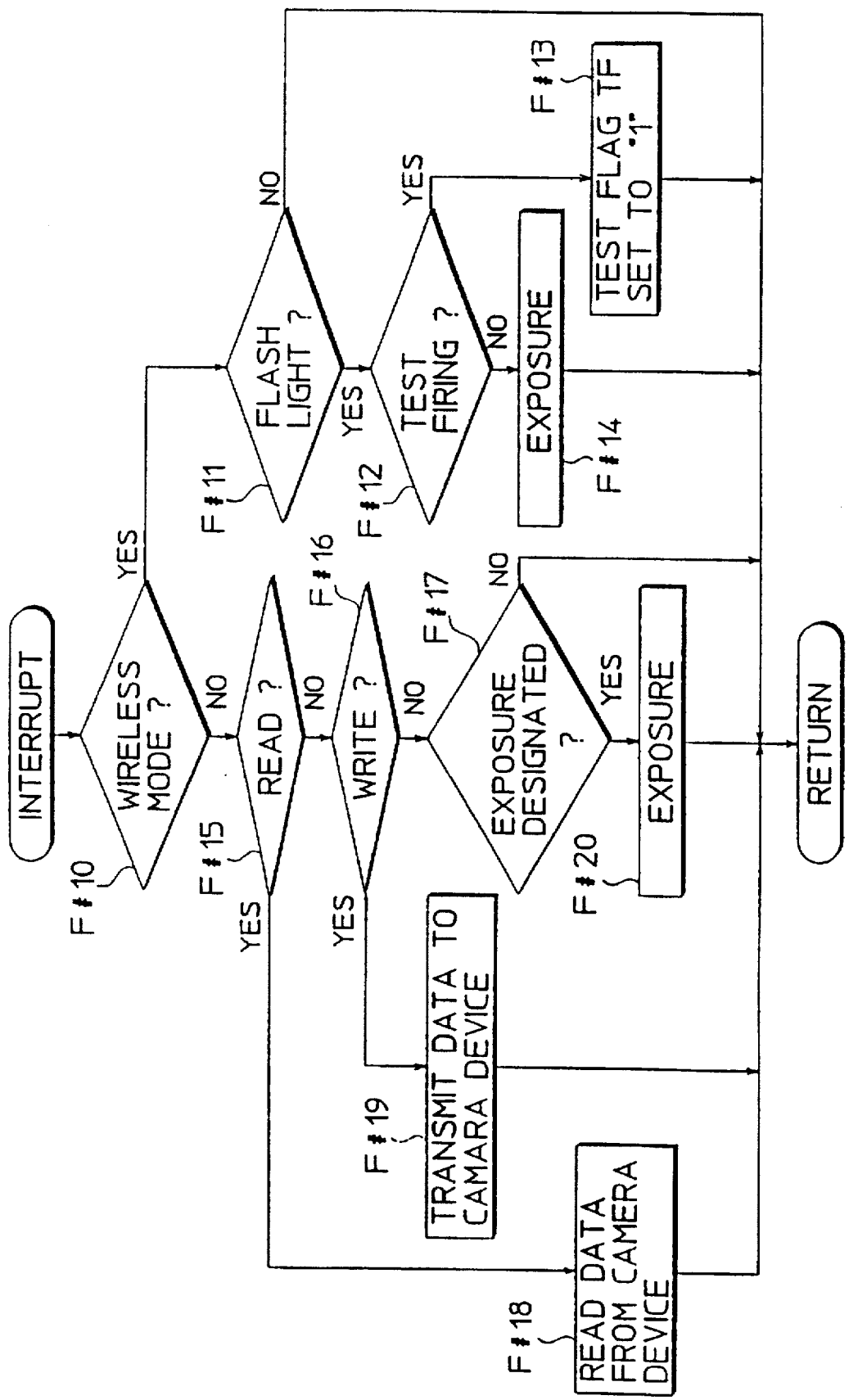
FIG. 13 is a flowchart showing an interrupt routine.

FIG. 13 is a flowchart showing an interrupt routine executed when an interrupt signal for requesting the main flash firing or test flash firing is input.

While the main routine shown in FIG. 12 is executed, an interrupt operation is carried out upon receipt of a signal representative of the received flash light from the receiver 501B in the wireless mode, and upon receipt of a communication signal with the camera device 600 in the normal mode.

In FIG. 13, Steps F#10 to F#14 are carried out for the interrupt operation in the wireless mode, while Steps F#15 to F#20 are carried out for the interrupt operation in the normal mode.

Upon entering the interrupt operation, it is judged the interrupt request has been made in response to the signal input from the light receiving circuit 501 to the WL terminal of the CPU 505 or through the serial communication between the flash device 100 and the camera device (Step F#10).

Upon receipt of the flash light, the light receiving circuit 501 sends a low level pulse as an interrupt signal to the WL terminal of the CPU 505. In a state where the flash device 100 is mounted on the camera device 650, the serial communication is conducted between the flash device 100 and the camera device 600 by way of the contact pins P1 to P4 and an interrupt request is made from the camera device 600 to the flash device 100 through this serial communication.

If the interrupt request has-been made by the low level pulse input to the WL terminal (YES in Step F#10), it is further judged whether the flash light received by the light receiving circuit 501 is emitted from the camera device 600 (Step F#11). This judgment is made by judging whether the firing frequency and flash firing number of the flash light correspond with the predetermined values.

If the flash light is not the one emitted from the camera device 600 (NO in Step F#11), this routine returns, assuming this flash light as a noise. If, on the other hand, the flash light is the one emitted from the camera device 600 (YES in Step F#11), it is judged whether the information carried by this flash light is to instruct the test firing (Step F#12).

If the transmitted information is to instruct the test firing (YES in Step F#12), this routine returns after setting a test flag TF to "1" (Step F#13). If the transmitted information is not to instruct the test firing (NO in Step F#12), i.e., if it is to instruct the main firing, a specified exposure is carried out (Step F#14). In the exposure, the xenon discharge tube 401 is caused to carry out the main firing in accordance with a X contact timing signal transmitted from the camera device 600.

If the interrupt request has been made through the serial communication (NO in Step F#10), it is judged whether the interrupt request content is a communication request from the camera device 600 to the flash device 100, the one from the flash device to the camera device 600, and the one to instruct an exposure in Steps F#15 to F#17.

Figure 14:
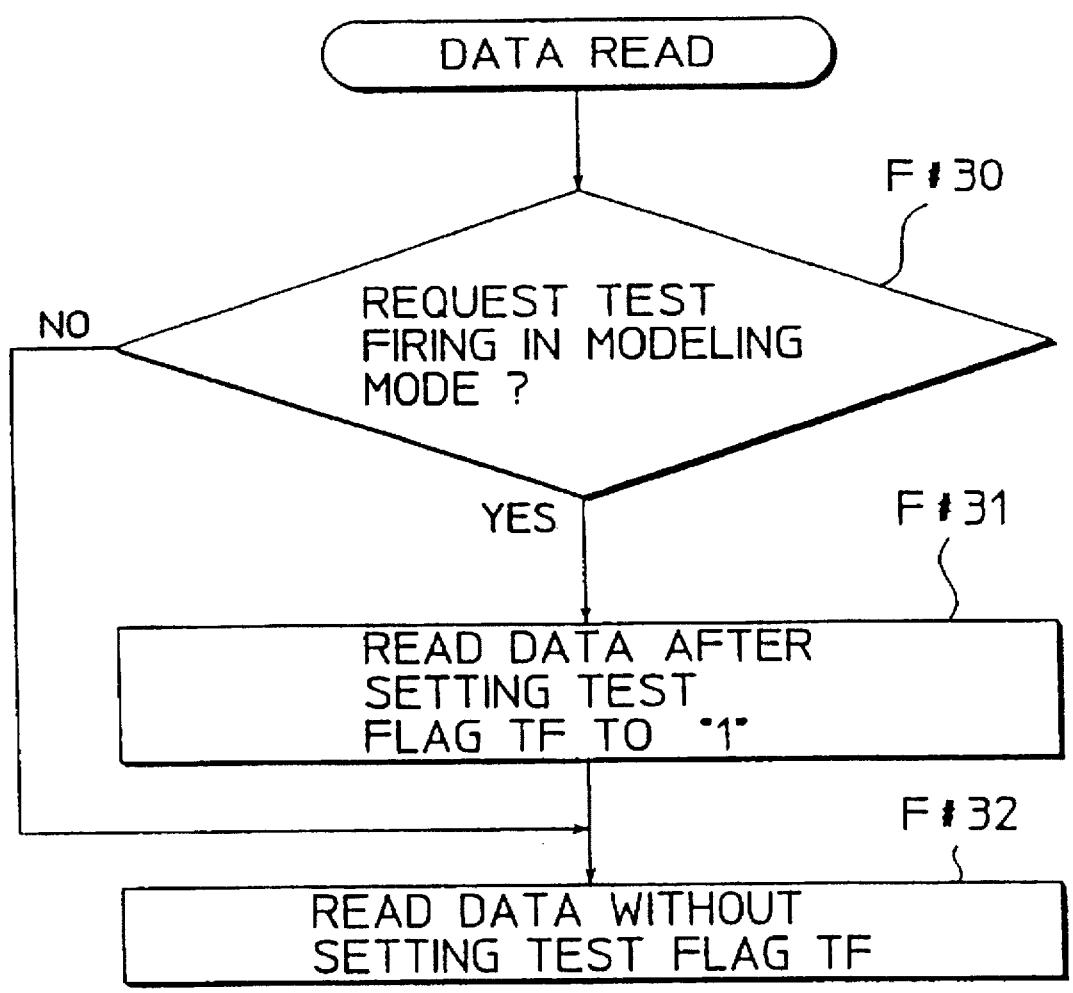
FIG. 14 is a flowchart showing a subroutine "READ"

If the interrupt request content is a communication request from the camera device 600 to the flash device 100 (YES in Step F#15), the data transmitted from the camera device 600 is read in accordance with a routine shown in FIG. 14 (Step F#18). More specifically, it is judged whether the spot motoring button 605 of the camera device 600 is operated to request the test firing in the modeling mode (Step F#30). If the test firing is requested (YES in Step F#30), the data is read (Step F#32) after setting the test flag TF to "1" (Step F#31). If the test firing in the modeling mode is not requested (NO in Step F#30), the data is read (Step F#32) without setting the test flag TF. A specified data is transmitted from the flash device 100 to the camera device 600 (Step F#19) if the interrupt request content is a communication request from the flash device 100 to the camera device 600 (YES in Step F#16), whereas a specified exposure is carried out (Step F#14) if the interrupt request content is to instruct the exposure (YES in Step F#17). During this exposure, the xenon discharge tube 401 carries out the main firing in synchronism with the X contact timing signal which is input to the X terminal by way of the contact pin P3 from the camera device 600, for example, at an inverting timing of a level inversion signal when its level is inverted from high to low.

Figure 15:
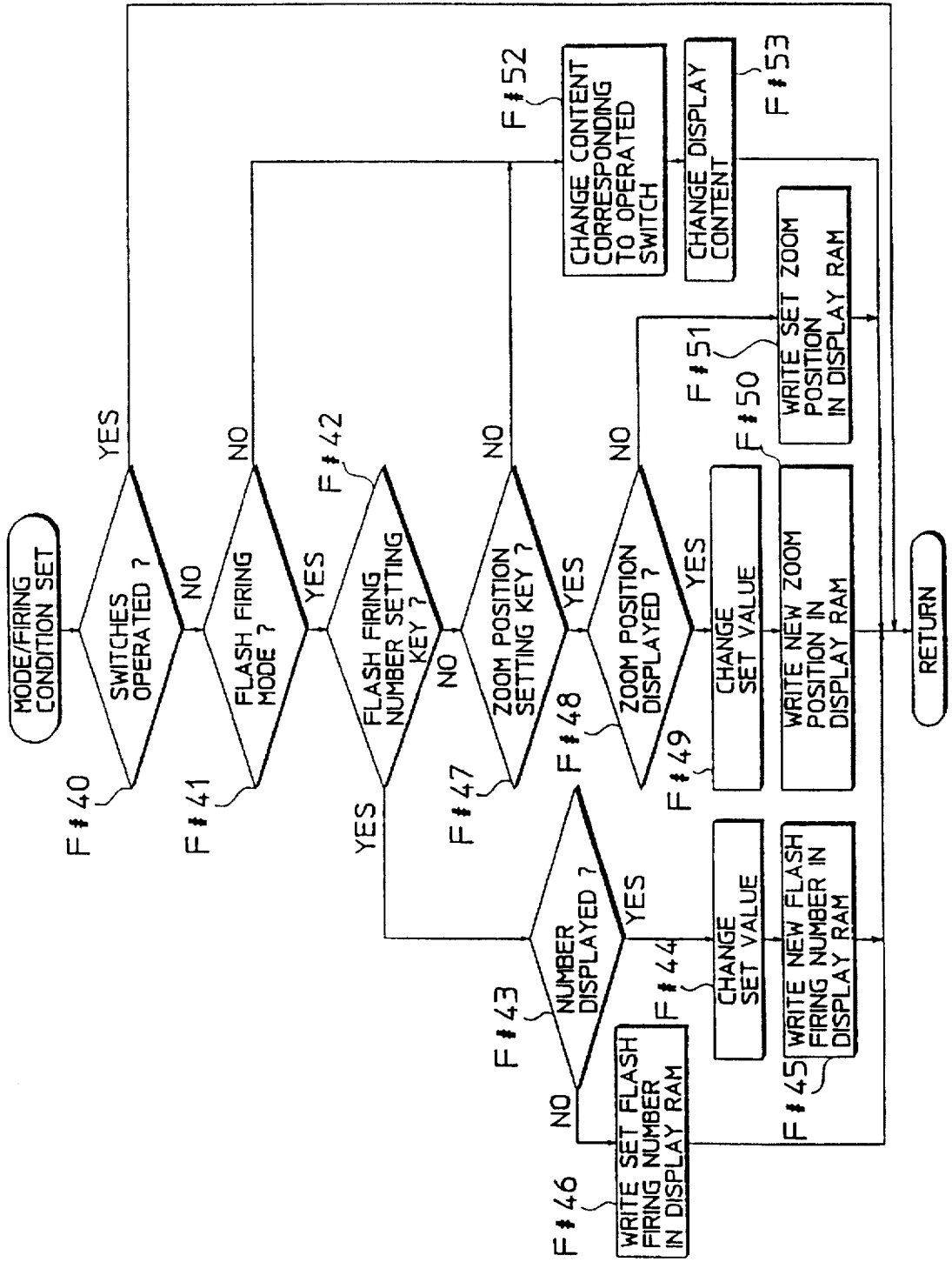
FIG. 15 is a flowchart showing a mode and firing condition setting operation carried out when a multi-mode is set.

FIG. 15 is a flowchart showing a mode and firing conditions setting operation carried out when the switch S5 is operated to set a multi-mode in Step F#5.

When the switch(es) in the operation unit 303 is/are operated in Step F#7, it is judged whether a plurality of switches are simultaneously operated (Step F#40). If a plurality of switches are simultaneously operated, this routine returns to Step F#6, assuming that an operation error has occurred, with the result that the present display content in the display unit 302 remains unchanged. If any one of the switches has been operated in a normal manner (NO in Step F#40), the set flash firing mode is judged (Step F#41). If the flash firing mode is set to the normal mode (NO in Step F#41), the display content corresponding to the operated switch is changed to a value set by this switch (Steps F#42, F#43) and this routine returns to Step F#6, with the result that the display content in the display unit 302 is changed to the newly set value.

If the flash firing mode is set to the multi-mode (YES in Step F#41), it is judged whether the operated switch is the switch S7 (flash firing number setting key) in Step F#42. If the switch S7 has been operated (YES in Step F#42), this routine proceeds to Steps F#43 to F#46 wherein the display content in the display unit 302 is changed to the flash firing number set by the switch S7.

More specifically, if the flash firing number is presently displayed in the display section DA5 of the display unit 302 (YES in Step F#43), the flash firing number is changed to a newly set value (Step F#44) and the new flash firing number is newly written in the display RAM (Step F#45). In this way, the flash firing number displayed in the display section DA5 is changed to the new set value.

If the zooming position is displayed in the display section DA5 (NO in Step F#43), the set flash firing number is written in the display RAM (Step F#46), and thereby the display content in the display section DA5 is changed to the set flash firing number.

If the switch operated in Step F#42 is not the switch S7 (NO in Step F#42), it is judged whether the operated switch is the switch S8 (zooming position setting key) in Step F#47. If the switch S8 has been operated (YES in Step F#47), this routine proceeds to Steps F#48 to F#51 wherein the display content in the display unit 302 is changed to the zooming position set by the switch S8.

More specifically, if the zooming position is presently displayed in the display section DA5 (YES in Step F#48), the zooming position is changed to the newly set value (Step F#49) and the new zooming position is written in the display RAM (Step F#50). In this way, the zooming position displayed in the display section DA5 is changed to the new set value.

If the flash firing number is presently displayed in the display section DA5 (NO in Step F#48), the set zooming position is written in the display RAM (Step F#51) and thereby the display content of the display section DA5 is changed to the set zooming position.

If the switch operated in Step F#47 is not the switch S8 (NO in Step F#47), this routine proceeds to, Steps F#52 and F#53, wherein the content corresponding to the operated switch is changed to a value set by this switch and the display content in the display unit 302 is changed according to the newly set value.

Figure 16B:
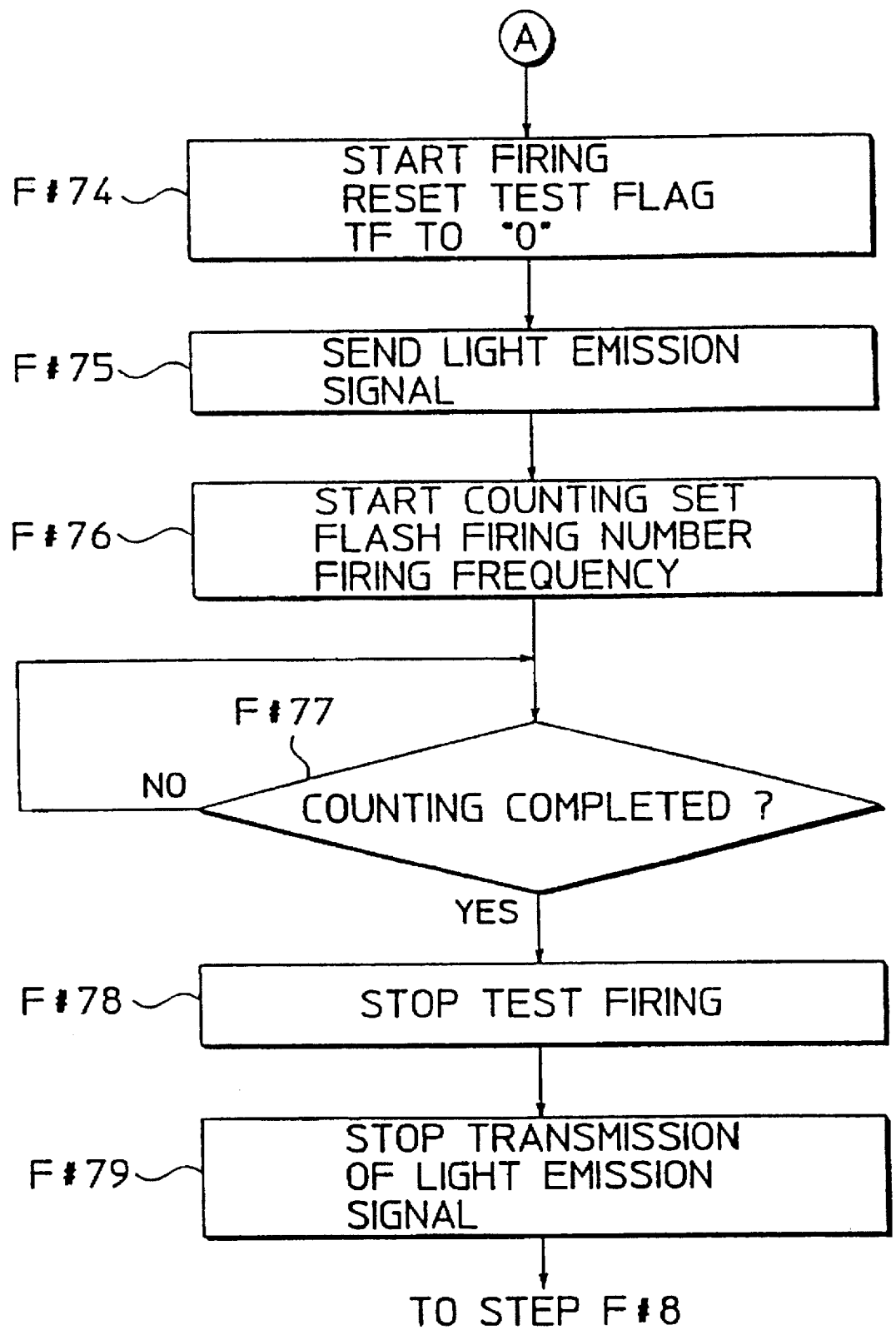

FIGS. 16A and 16B are flowcharts showing a firing control operation when a test firing is instructed.

If the switch S4 has been operated to instruct the test firing in Step F#7 or the test flag TF is set to "1" in Step F#13 (see FIG. 13), the set states of the flash firing mode and modeling mode are judged in Steps F#60 to F#62 and operations according to the set states of the respectively modes are carried out in Steps F#63 to F#73.

If the flash firing mode is set to the multi-mode (YES in Step F#60), the modeling mode is reset to "OFF" in Step F#63 and the firing conditions: the amount of flash light to be emitted, firing frequency and flash firing number selected by operating the switches S1, S6 and S7 are set one after another (Steps F#64, F#65, F#66).

If the flash firing mode is set to the single mode and the modeling mode is reset to "OFF" (NO in Steps F#60 and F#61), i.e., in the case of the normal test firing, the amount of flash light selected by operating the switch S1 is set (Step F#67).

When the flash firing mode is set to the single mode and the modeling mode is set to the portrait mode (NO in Step F#60, Yes in Steps F#61 and F#62), the preset firing conditions: the amount of flash light to be emitted (e.g., GN 5.6), firing frequency (e.g., 2 Hz) and flash firing time (e.g., 1.5 sec.), in the portrait mode are set one after another (Steps F#68, F#69 and F#70). When the flash firing mode is set to the single mode and the modeling mode is set to the macro-mode (NO in Step F#60, YES in Step F#61, NO in Step F#62), the preset firing conditions: the amount of flash light to be emitted (e.g., GN 1.2), firing frequency (e.g., 40 Hz) and flash firing time (e.g., 4 sec), in the macro-mode are set one after another (Steps F#71, F#72 and F#73).

Subsequently, the flash device 100 is fired in accordance with the set firing conditions and the test flag TF is reset to "0" (Step F#74). The flash device 100 sends to the camera device 600 a light emission signal representing that the flash device 100 is being fired (Step F#75). This signal is output from the SI/SO terminal and is, for example, a state judgment signal which is at high level when the flash device 100 is not fired and is at low level when it is fired. Accordingly, in Step F#75, the level of the state judgment signal is inverted from high to low. In the multi-mode, the firing is repeated twice, three times, . . . after the first firing.

Subsequently, the counting of the set flash firing number and the firing frequency is started (Step F#76). Upon completion of a specified flash firing number and firing frequency (YES in Step F#77), the test firing is stopped (Step F#78) and the transmission of the light emission signal is stopped after inverting the level of the state judgment signal from low to high (Step F#79).

Figure 17A:
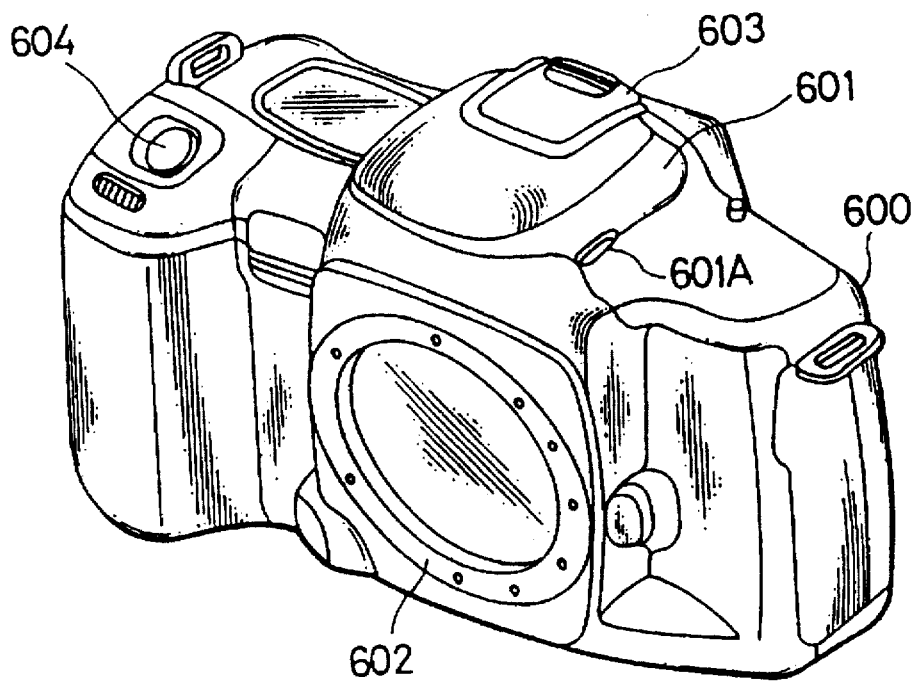
FIGS. 17A and 17B are perspective views showing a front side and a back side of a camera device used in the flash photographing system, respectively.
Figure 17B:
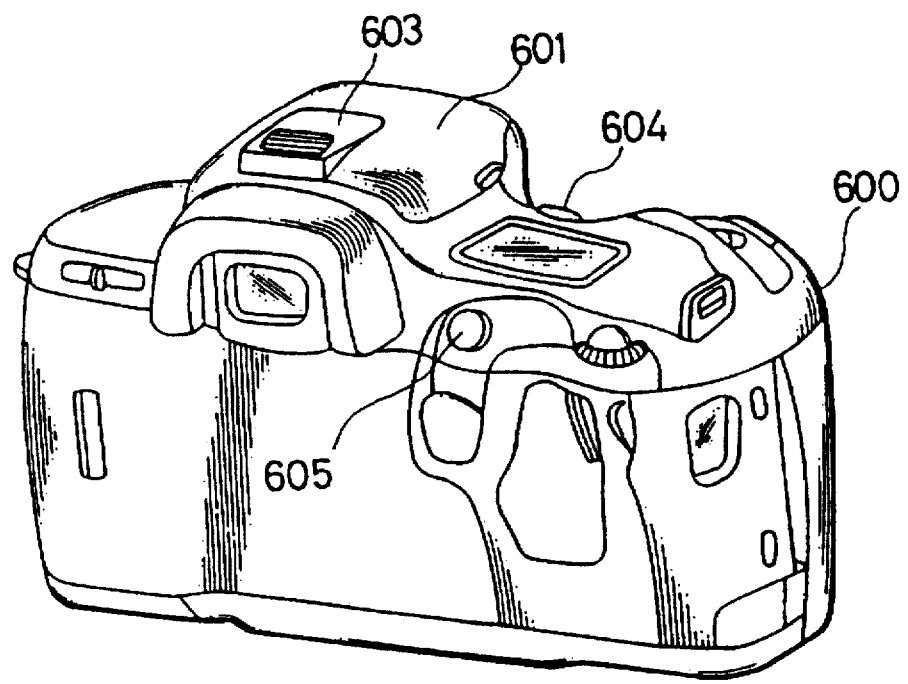

Next, a construction of the camera device 600 will be described. FIGS. 17A and 17B are perspective views showing a front side and a back side of the camera device 600 used in the flash photographing system, respectively.

A lens mount 602 on which an interchangeable lens is mounted is provided substantially in the middle of the front face of the camera device 600. The built-in flash 601 is provided above the lens mount 602. The built-in flash 601 is such that an unillustrated light emitter moves upward, and is exposed from the camera device when a pull-up button 601A is pressed.

The camera device 600 is capable of remotely controlling the flash device 100 detached therefrom by transmitting a control signal to the flash device 100 using the flash light of the built-in flash 601. For example, by changing the flash firing number and firing frequency of the flash 601 according to the kind of the control signal, a plurality of kinds of control signals can be transmitted from the camera device 600 to the flash device 100 in the form of the flash light.

In the wireless mode, the control signal transmitted from the camera device 600 to the flash device 100 by firing the built-in flash 601 at a specified timing when a variety of operation buttons such as a release button 604 and a multi-functional button 605 are operated. The multi-functional button 605 is used to carry out the spot metering, the test firing in the modeling mode, the auto-exposure locking, and the like. When this button 605 is operated in the wireless mode during the flash photographing operation, a test firing request signal is transmitted in the form of the flash light to the flash device 100.

An accessory shoe 603 on which the flash device 100 is mounted is provided behind the built-in flash 601. The accessory shoe 603 is provided with four terminal plates (not shown) with which the four contact pins P1 to P4 projecting from the mount 304 of the flash device 100 are in contact. When the flash device 100 is mounted on the camera device 600, the communication lines are connected by way of the contact pins P1 to P4 and a variety of information concerning the flash firing are serially communicated by way of the communication lines. The firing control signal is transmitted to the flash device 100 through the serial communication in the normal mode.

Figure 18:
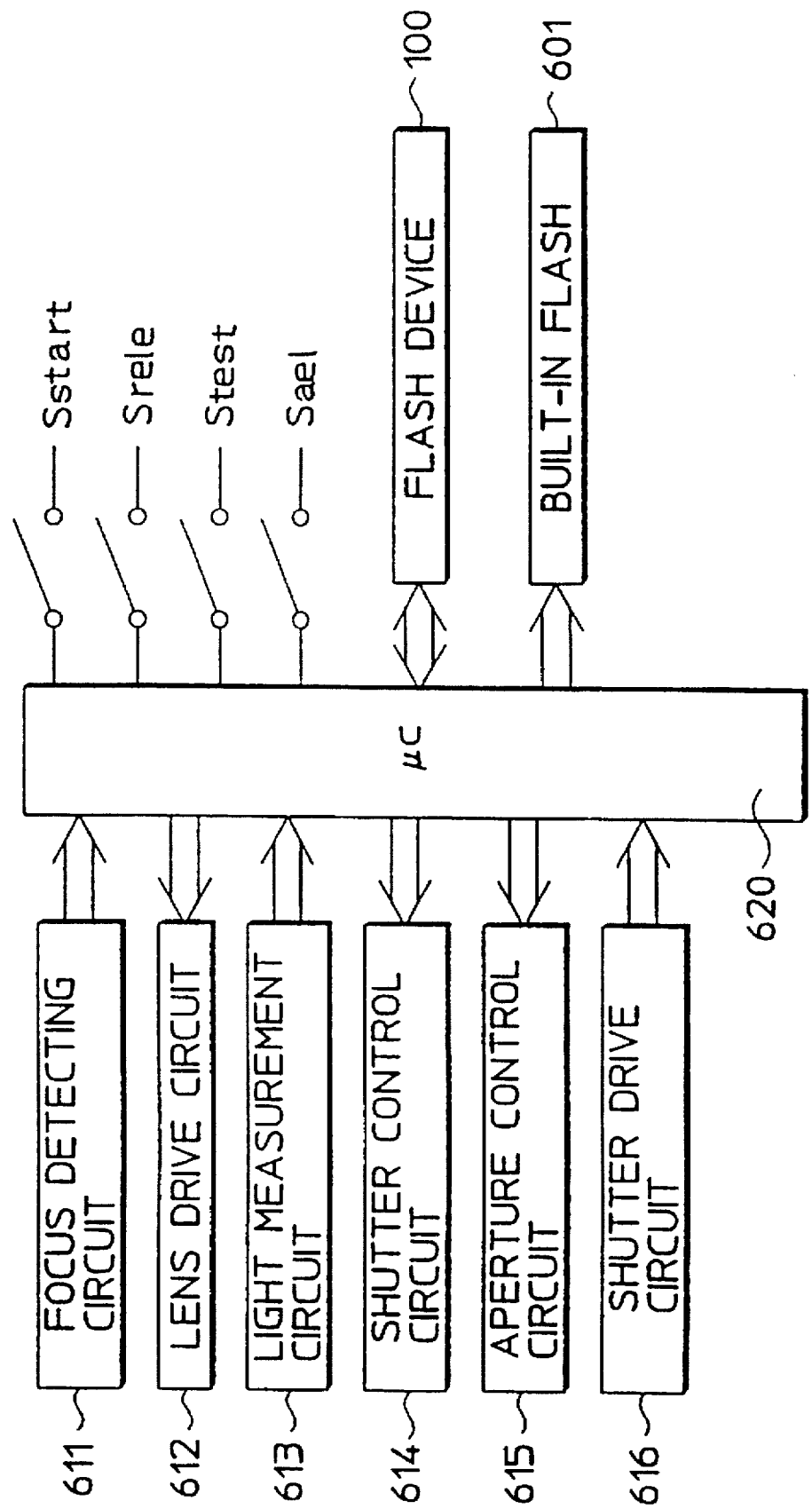
FIG. 18 is a block diagram showing a control system of the camera device.

FIG. 18 is a block diagram showing a control system of the camera device 600. The camera device includes a focus detecting circuit 611 for detecting a focusing condition, a lens drive circuit 612 for driving the taking lens to attain an in-focus condition based on the detected focusing condition, a light measurement circuit 613 for calculating a brightness of an object, a shutter control circuit 614 for calculating a shutter speed based on the light measurement value obtained by the circuit 613 and controlling a shutter in accordance with the calculated shutter speed, an aperture control circuit 615 for calculating an aperture value based on the light measurement value obtained by the circuit 613 and controlling a diaphragm in accordance with the calculated aperture value, a shutter drive circuit 616 for driving the shutter and the diaphragm, a light measurement start switch Sstart to be turned when pressing the release button 604 halfway, a release switch Srele to be turned on when pressing the release button 604 entirely, an auto-exposure lock-switch Sael to be turned on when operating the multi-functional button 605 before the light measurement, the aforementioned switch Stest to turned on when pressing the multi-function button 605 in the modeling mode, and the aforementioned built-in flash 601. These parts are communicated with a microcomputer 620 operable to centrally control the whole operations of the camera device 600 in accordance with predetermined programs.

Figure 19:
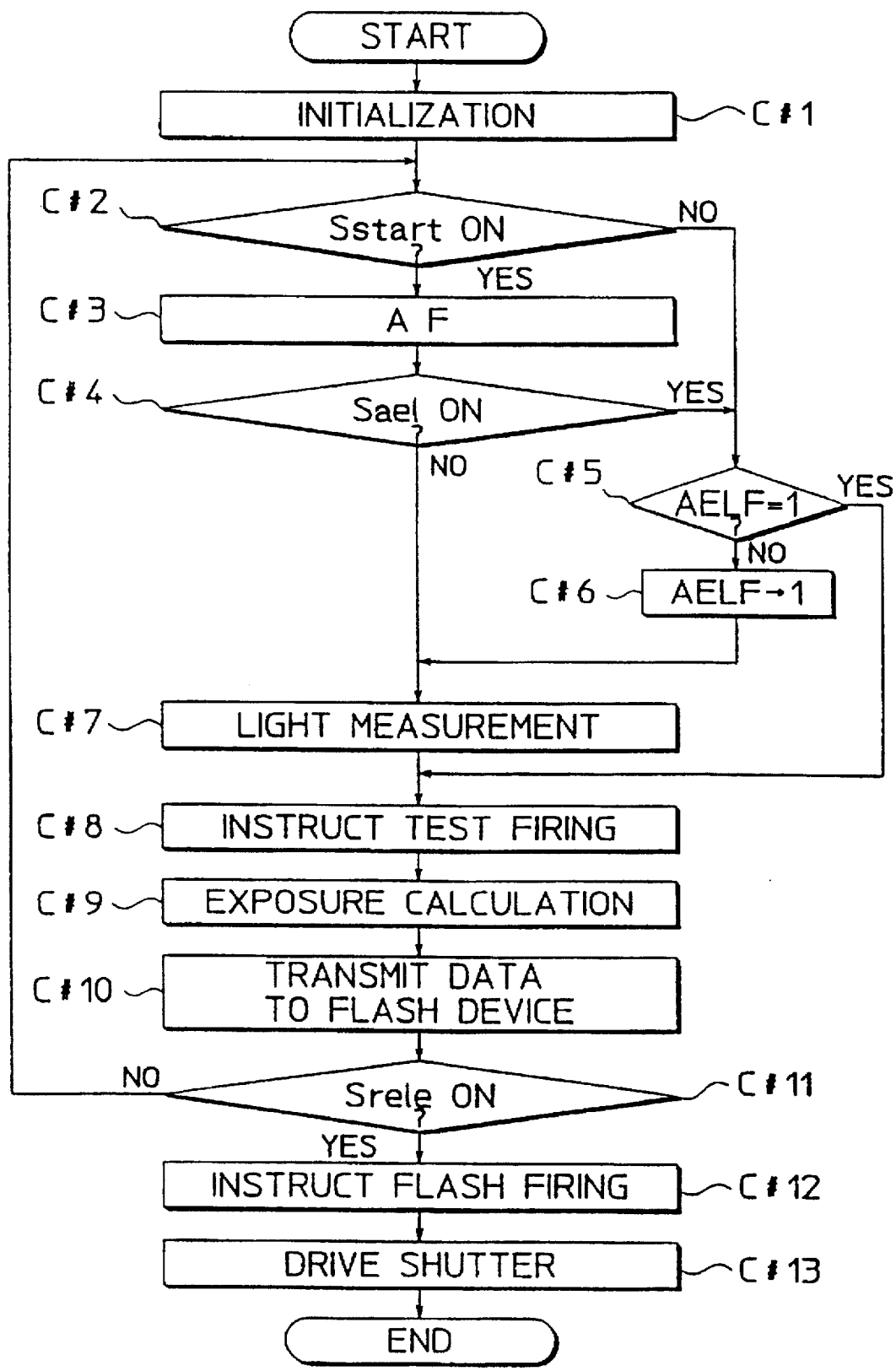
FIG. 19 is a flowchart showing a control routine of the camera device.

Operations of the camera device 600 will be described with reference to FIG. 19 showing a routine of the control system of the camera device 600. When the camera device 600 is powered to enable an operation, this routine is started, various values and flag are initialized or reset (Step C#1) and it is discriminated in Step C#2 whether the light measurement start switch Sstart is on.

If the light measurement start switch Sstart is turned on (YES in Step C#2), the autofocusing is executed in Step C#3 and it is discriminated in Step C#4 whether the autoexposure lock switch Sael is turned on. If the switch Sael is not turned on (NO in Step C#4), the light measurement is executed in Step C#7. Subsequently, the test firing is instructed in Step C#8.

If the light measurement start switch Sstart is not turned off (NO in Step C#2), this routine proceeds to Step C#5 in which it is discriminated whether an auto-exposure lock flag AELF has been set. The auto-exposure lock flag AELF is representative of the auto-exposure lock being put in work. If the auto-exposure lock switch is on (YES in Step C#4), this routine also proceeds to Step C#5.

If the flag AELF has been set (YES in Step C#5), this routine proceeds to Step C#7. On the other hand, if the flag AELF has not been set (NO in Step C#5), this routine proceeds to Step C#7 after the flag AELF is set in Step C#6.

After instructing the test firing, exposure calculation is executed based on the measured light amount in Step C#9, and data is transmitted to the flash device 100 in Step C#10.

Thereafter, it is discriminated in Step C#11 whether the release switch Srele is turned on. If the release switch Srele is turned on (YES in Step C#11), the flash firing is instructed to the flash device 100 in Step C#12 and the shutter is driven to execute the exposure of film in Step C#13.

Figure 20:
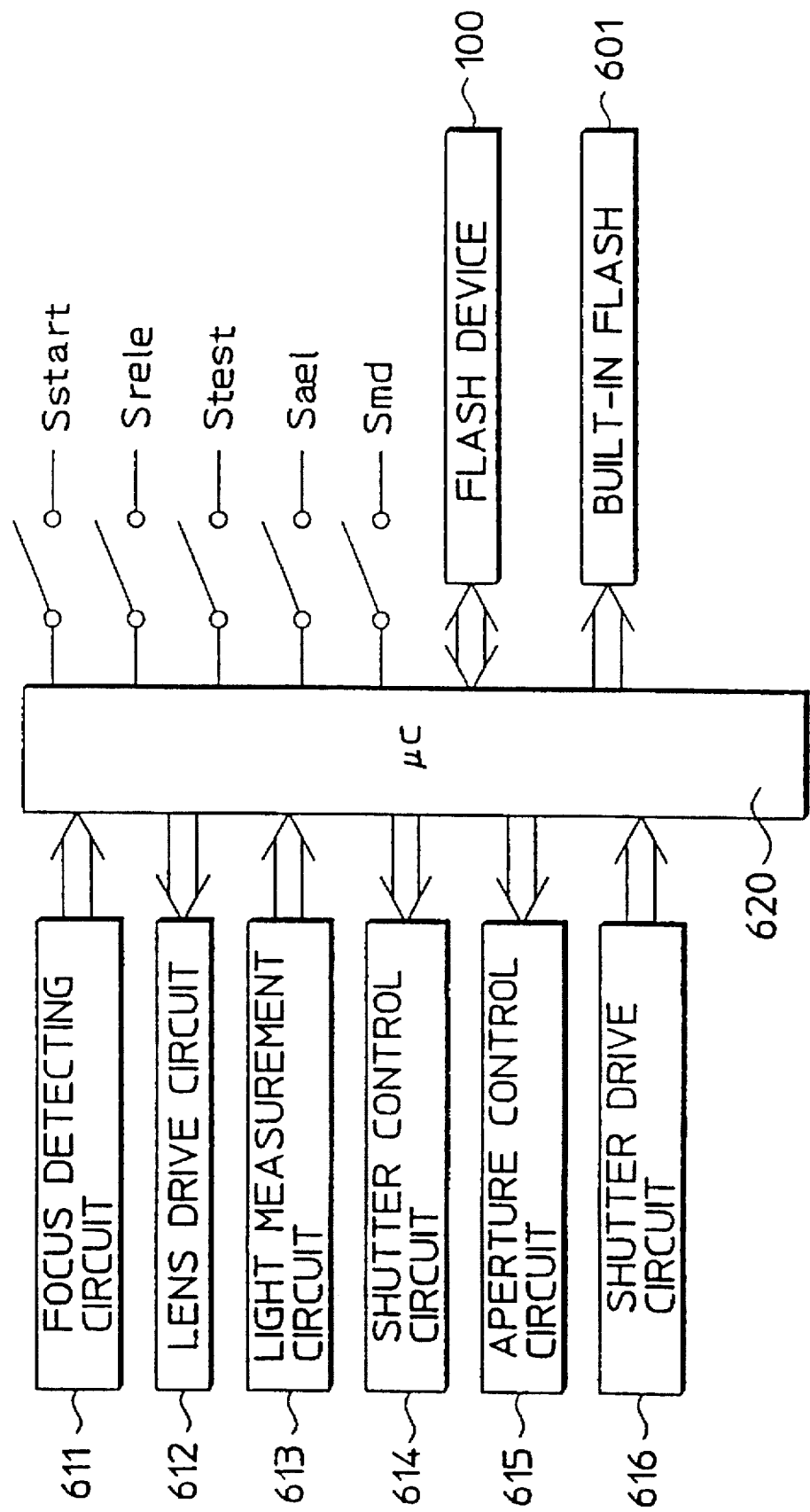
FIG. 20 is a block diagram showing a control system of a modified camera device.

In the foregoing embodiment, the modeling mode is changed at the side of flash device. However, it may be appreciated to enable changing of modeling mode at the side of camera device. FIG. 20 shows a control system of a camera device which makes it possible to change the modeling mode at the side of camera device. This camera device has a similar construction to that of the camera device shown in FIG. 18 except for the provision of a modeling mode change switch Smd. This change switch Smd may be turned on and off in accordance with operation of a multi-function button which is adapted for selection of exposure modes. This change switch Smd is turned on and off to select either a portrait mode or a macro-mode.

Figure 21:
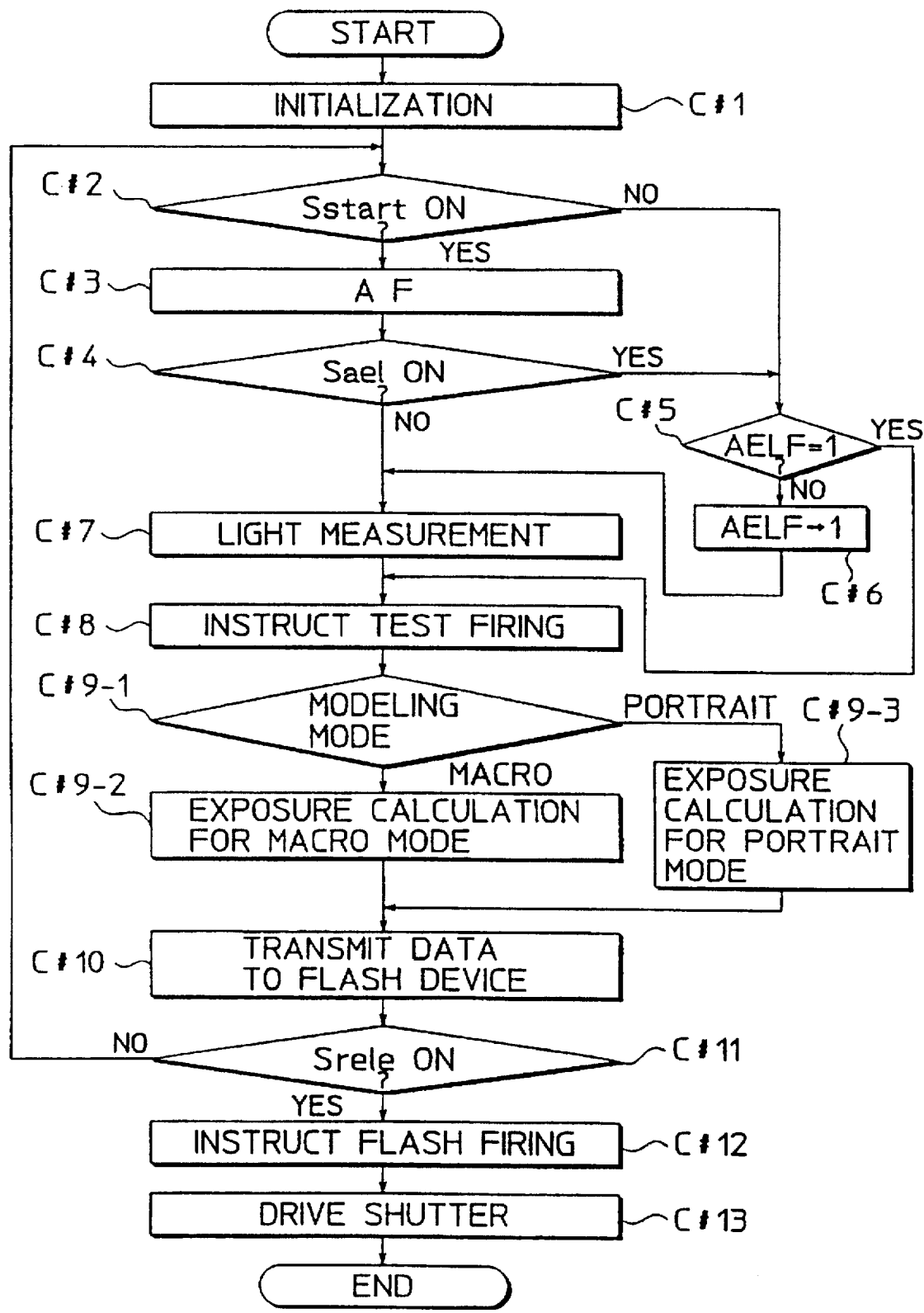
FIG. 21 is a flowchart showing a control routine of the modified camera device.

FIG. 21 is a flowchart showing operations of the camera device provided with the mode change switch Smd. The control routine of this camera is basically identical to that of the routine of the camera device 600 which is provided with no mode change switch. However, the exposure calculation is different for the macro mode and the portrait mode. For this reason, the exposure calculation of the routine shown in FIG. 19 is modified to Steps C#9-1 to C#9-3.

Specifically, after the test firing is instructed to the flash device 100 in Step C#8, it is discriminated in Step C#9-1 which modeling mode is selected. If the macro mode is selected, exposure calculation for the macro mode is executed in Step C#9-2. On the other hand, if the portrait mode is selected, exposure calculation for the portrait mode is executed in Step C#9-3. Thereafter, the same operations as the routine of FIG. 19 are executed.

The remotely-controlled flash photographing system which enables changing of modeling mode at the side of camera device will, comparing to the system where the modeling mode is changed at the side of flash device, reduce the number of parts and the size of flash device, and thus reduce the costs of production. Also, the camera device provided with the mode change switch will assure easier handling or photography.

As mentioned above, the remotely-controlled flash photographing system of the present invention includes the camera device 600 and the flash device 100 remotely controllable by a radio signal transmitted from the camera device 600. The camera device 600 is provided with the built-in flash 601 and instruction means. When the instruction means of the camera device 600 is operated, the specified test firing request signal is generated in response to this operation. This signal is transmitted to the flash device 100 by means of the specified flash light generated by the built-in flash 601. Upon receipt of this flash light, the flash device 100 receives the test firing request signal carried thereby and carries out the test firing in accordance with the predetermined firing conditions for confirming the presence of the shadow cast on the object by the flash light.

For example, the flash device 100 is fired three times with a light amount corresponding to a guide number GN of 5.6 each time and a firing frequency of 2 Hz to illuminate the object. Accordingly, during the normal flash photographing operation such as when taking a snapshot, the direction and size of the shadow cast on the object by the flash light 100 can be confirmed in an actual view by operating the test firing instruction means while looking through a viewfinder of the camera device 600.

Also, two mode can be selected as a test firing mode for confirming the presence of the shadow cast on and behind the object by the flash light. When the test firing is carried out in the first mode, the flash light generation means carries out the multi-firing with a large light amount and a low frequency.

For example, the flash device 100 is fired three times with a firing frequency of 2 Hz and a light amount corresponding to a guide number GN of 5.6 each time, to thereby illuminate the object with the flash light. Thus, in the normal photographing operation such as when taking a snapshot, the direction and size of the shadow cast on a wall or something behind the object by the flash light can be confirmed by carrying out the test firing in the first mode.

When the test firing is carried out in the second mode, the flash light generation means carries out the multi-firing with a small light amount and a high frequency. For example, the flash device 100 is fired 160 times for 4 seconds with a firing frequency of 40 Hz and a light amount corresponding to a guide number GN of 1.2 each time, to thereby illuminate the object with the flash light. Thus, in a macrophotography such as when taking flowers or the like, the small shadows created in petals and leaves by the flash light can be confirmed by carrying out the test firing in the second mode.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A flash photographing system comprising a camera and an electrically actuated flash device:
   the camera including:
   a photographing device operable to photograph an object;
   a first operable member to instruct a test firing of the electrically actuated flash device for producing a modeling illumination which enables a photographer to view a flash light illumination state of the object before the object is photographed under a flash light illumination by the electrically actuated flash device;
   a second operable member to drive the photographing device to execute photography; and
   a signal generator operable to generate a first control signal in accordance with an operation of the first operable member and a second control signal in accordance with an operation of the second operable member, and to transmit the thus generated first and second control signals to the electrically actuated flash device;
   the electrically actuated flash device including:
   a signal receiver operable to receive the first and second control signals from the camera;
   a flash light emitter operable to emit flash light;
   a first firing controller responsive to the thus received first control signal to control the flash light emitter and to generate intermittent signals to intermittently emit flash light a specified number of times to execute the test firing for the modeling illumination; and
   a second firing controller responsive to the thus received second control signal to control the flash light emitter to emit flash light for the photography.

2. A system as defined in claim 1, wherein:
   the camera further includes a light measurement device operable to measure light reflected from the object; and
   the second operable member has a first operation stage to drive the light measurement device and a second operation stage to drive the photographing device.

3. A system as defined in claim 1, wherein the electrically actuated flash device further includes a third operable member which is operable to instruct the first firing controller to execute the test firing for the modeling illumination.

4. An electrically actuated flash device for use with a camera which is capable of transmitting first and second control signals, the electrically actuated flash device comprising:

a signal receiver operable to receive the first and second control signals from the camera;
a flash light emitter operable to emit flash light;
a first firing controller responsive to the thus received first control signal to control the flash light emitter to generate intermittent signals to intermittently emit flash light a specified number of times to execute a test firing of the electrically actuated flash device for producing a modeling illumination which enables a photographer to view a flash light illumination state of an object before the object is photographed under a flash light illumination by the electrically actuated flash device; and
a second firing controller responsive to the thus received second control signal to control the flash light emitter to emit flash light for photographing the object.

5. A flash photographing system comprising:
a camera to photograph an object;
an electrically actuated flash having only one electrically actuated flash emitter to illuminate the object;
a modeling controller which controls the flash emitter to produce a modeling illumination to enable a photographer to view a flash light illumination state of the object before the object is photographed under a flash light illumination by the flash emitter;
wherein the modeling controller has first and second selectable control modes;
wherein the modeling controller controls the flash emitter to perform a first emission in the first selectable control mode and controls the flash emitter to perform a second emission in the second selectable control mode, the first emission and the second emission being different from each other; and
a selector which is adapted to select either one of the first selectable control mode and the second selectable control mode.

6. A system as defined in claim 5, wherein the modeling controller controls the flash emitter to intermittently emit flash light a specified number of times to enable a photographer to view a flash light illumination state of the object.

7. A system as defined in claim 6, wherein the modeling controller controls the flash emitter to emit flash light having a greater amount of light in the first selectable control mode than in the second selectable control mode.

8. A system as defined in claim 6, wherein the modeling controller controls the flash emitter to emit flash light having a greater frequency in the first selectable control mode than in the second selectable control mode.

9. A system as defined in claim 6, wherein the modeling controller controls the flash emitter to emit flash light a greater number of times in the first selectable control mode than in the second selectable control mode.

10. A system as defined in claim 6, wherein the modeling controller controls the flash emitter to emit flash light for a longer time in the first selectable control mode than in the second selectable control mode.

11. A flash photographing system comprising:
a camera which is adapted to photograph an object;
an electrically actuated flash emitter removably mounted on the camera to emit flash light, the flash emitter being integrally provided with a modeling controller which generates intermittent signals and controls the flash emitter to emit flash light a specified number of times to produce a modeling illumination which enables a photographer to view a flash light illumination state of the object before the object is photographed under a flash light illumination by the flash emitter; and an operable member integrally provided on the camera to instruct the modeling controller to produce the intermittent flash emission for the modeling illumination.

12. A flash photographing system comprising:

a camera to photograph an object, the camera being integrally provided with a selector which selects one from a plurality of photography modes;

an electrically actuated flash device to illuminate the object, the electrically actuated flash device being integrally provided with a modeling controller which controls the electrically actuated flash device to produce a modeling illumination to enable a photographer to view a flash light illumination of the object before the object is photographed under a flash light illumination by the electrically actuated flash device, the modeling controller having a first modeling mode and a second modeling mode which are selectable, the modeling controller controlling the electrically actuated flash device to perform a first emission in the first modeling mode and controlling the electrically actuated flash device to perform a second emission in the second modeling mode; and a modeling mode changer operable to select between the first modeling mode and the second modeling mode in accordance with a selected photography mode.

13. A system as defined in claim 12, wherein the plurality of photography modes corresponds to a plurality of photographing scenes.

14. A system as defined in claim 13, wherein the first modeling mode and the second modeling mode are different from each other in aspect of amount of light emitted by said electrically actuated flash device.

* * * * *